(12) United States Patent
Park et al.

(10) Patent No.: US 12,098,224 B2
(45) Date of Patent: Sep. 24, 2024

(54) POLYETHYLENE AND METHOD FOR PREPARING THE SAME

(71) Applicant: LG Chem, Ltd., Seoul (KR)

(72) Inventors: Ha Na Park, Daejeon (KR); Sungho Choi, Daejeon (KR); Hyein Ryu, Daejeon (KR); Sangjin Jeon, Daejeon (KR); Seungmi Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 756 days.

(21) Appl. No.: 17/292,503

(22) PCT Filed: Sep. 28, 2020

(86) PCT No.: PCT/KR2020/013170
§ 371 (c)(1),
(2) Date: May 10, 2021

(87) PCT Pub. No.: WO2021/071154
PCT Pub. Date: Apr. 15, 2021

(65) Prior Publication Data
US 2022/0017665 A1 Jan. 20, 2022

(30) Foreign Application Priority Data

Oct. 11, 2019 (KR) .................. 10-2019-0126480
Sep. 25, 2020 (KR) .................. 10-2020-0125237

(51) Int. Cl.
C08F 210/02 (2006.01)
C08F 210/16 (2006.01)
C08J 5/18 (2006.01)

(52) U.S. Cl.
CPC ............ *C08F 210/02* (2013.01); *C08J 5/18* (2013.01); *C08F 2420/00* (2013.01); *C08J 2323/08* (2013.01)

(58) Field of Classification Search
CPC ... C08F 210/02; C08F 210/16; C08F 2500/37
See application file for complete search history.

(56) References Cited

U.S. PATENT DOCUMENTS

| | | | |
|---|---|---|---|
| 5,914,289 | A | 6/1999 | Razavi |
| 6,127,305 | A | 10/2000 | Milani et al. |
| 6,492,475 | B1 | 12/2002 | Egashira et al. |
| 10,538,654 | B2 | 1/2020 | Wang et al. |
| 2005/0159300 | A1 | 7/2005 | Jensen et al. |
| 2010/0099824 | A1 | 4/2010 | Helland et al. |
| 2012/0238720 | A1 | 9/2012 | Lam et al. |

(Continued)

FOREIGN PATENT DOCUMENTS

| | | | |
|---|---|---|---|
| CN | 1135490 A | 11/1996 | |
| CN | 1930196 A | 3/2007 | |

(Continued)

OTHER PUBLICATIONS

International Search Report for Application No. PCT/KR2020/013170, mailed Jan. 6, 2021, 4 pages.

(Continued)

*Primary Examiner* — Catherine S Branch
(74) *Attorney, Agent, or Firm* — Lerner David LLP

(57) ABSTRACT

In the present disclosure, there are provided a polyethylene having improved low-temperature sealing properties with an increase in the content and molecular weight of a low crystalline polymer, and a method for preparing the same.

18 Claims, 12 Drawing Sheets

(56) References Cited

U.S. PATENT DOCUMENTS

| | | |
|---|---|---|
| 2015/0252159 A1 | 9/2015 | Ker et al. |
| 2017/0218105 A1 | 8/2017 | Kim et al. |
| 2018/0061522 A1 | 3/2018 | Aida et al. |
| 2018/0134881 A1 | 5/2018 | Demirors et al. |
| 2019/0040167 A1 | 2/2019 | Holtcamp et al. |

FOREIGN PATENT DOCUMENTS

| | | |
|---|---|---|
| CN | 104470955 A | 3/2015 |
| CN | 106795242 A | 5/2017 |
| EP | 0735059 A2 | 10/1996 |
| EP | 3162817 A1 | 5/2017 |
| JP | H06184216 A | 7/1994 |
| JP | H08325333 A | 12/1996 |
| JP | 2003082018 A | 3/2003 |
| JP | 2003096124 A | 4/2003 |
| JP | 2003096125 A | 4/2003 |
| JP | 2003105029 A | 4/2003 |
| JP | 2008088442 A | 4/2008 |
| JP | 2008088443 A | 4/2008 |
| JP | 2012057174 A | 3/2012 |
| JP | 2015113282 A | 6/2015 |
| KR | 100414934 B1 | 1/2004 |
| KR | 20040076965 A | 9/2004 |
| KR | 20120073611 A | 7/2012 |
| KR | 20160115704 A | 10/2016 |
| KR | 20170076550 A | 7/2017 |
| KR | 20180022892 A | 3/2018 |
| KR | 101847907 B1 | 4/2018 |
| KR | 20180052422 A | 5/2018 |
| KR | 20190110961 A | 10/2019 |
| WO | 2004076502 A1 | 9/2004 |
| WO | 2017018353 A1 | 2/2017 |
| WO | 2019027585 A1 | 2/2019 |

OTHER PUBLICATIONS

Search Report for European Application No. 20874834.3 dated Nov. 29, 2021. 2 pgs.

[FIG. 1]
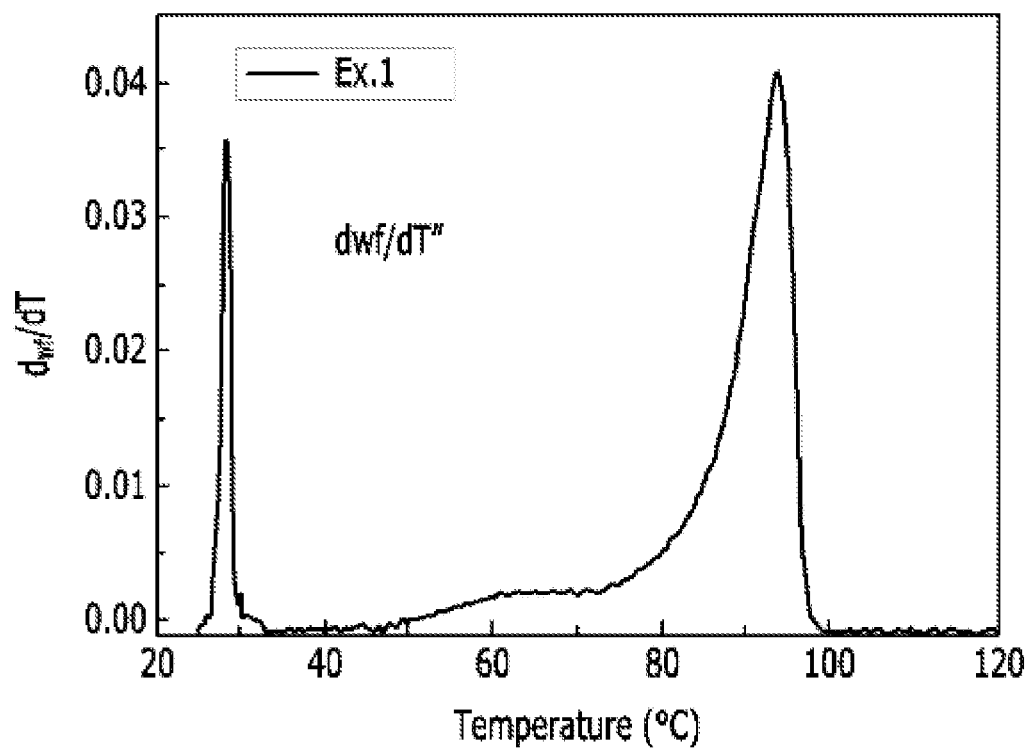

[FIG. 2]
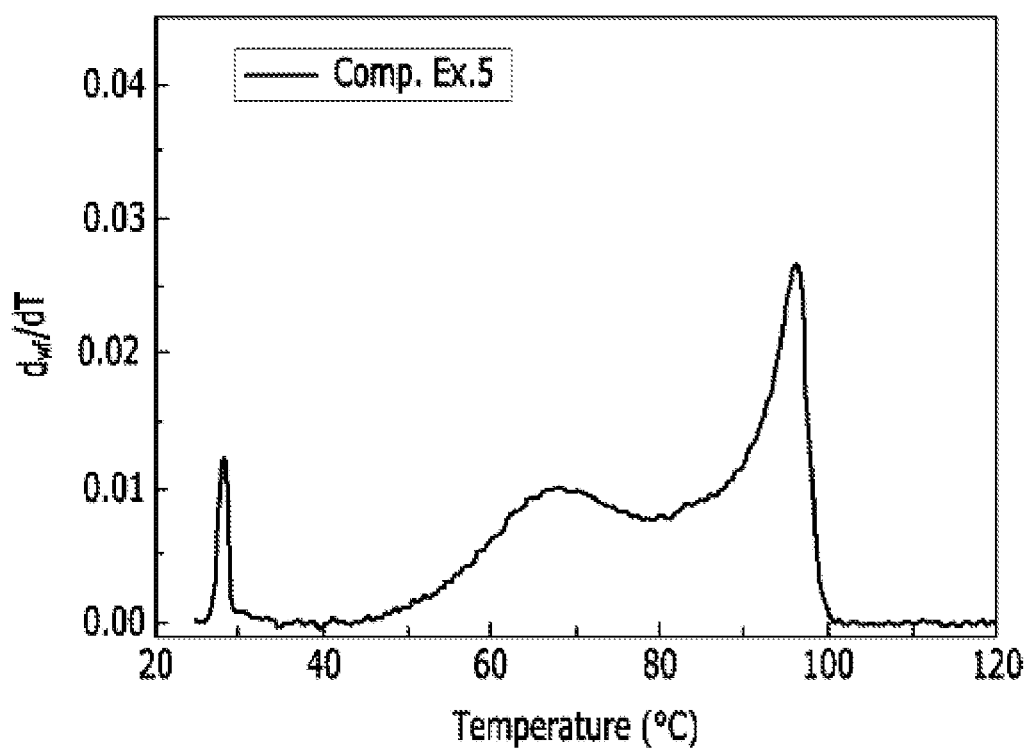

[FIG. 3]
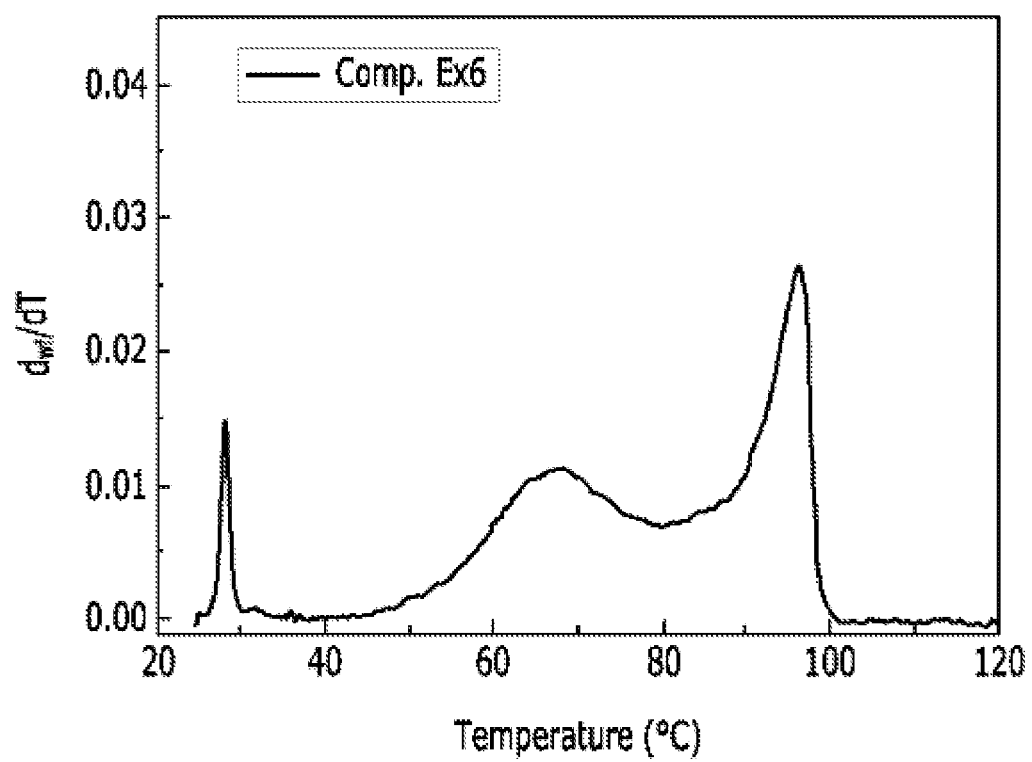

[FIG. 4]
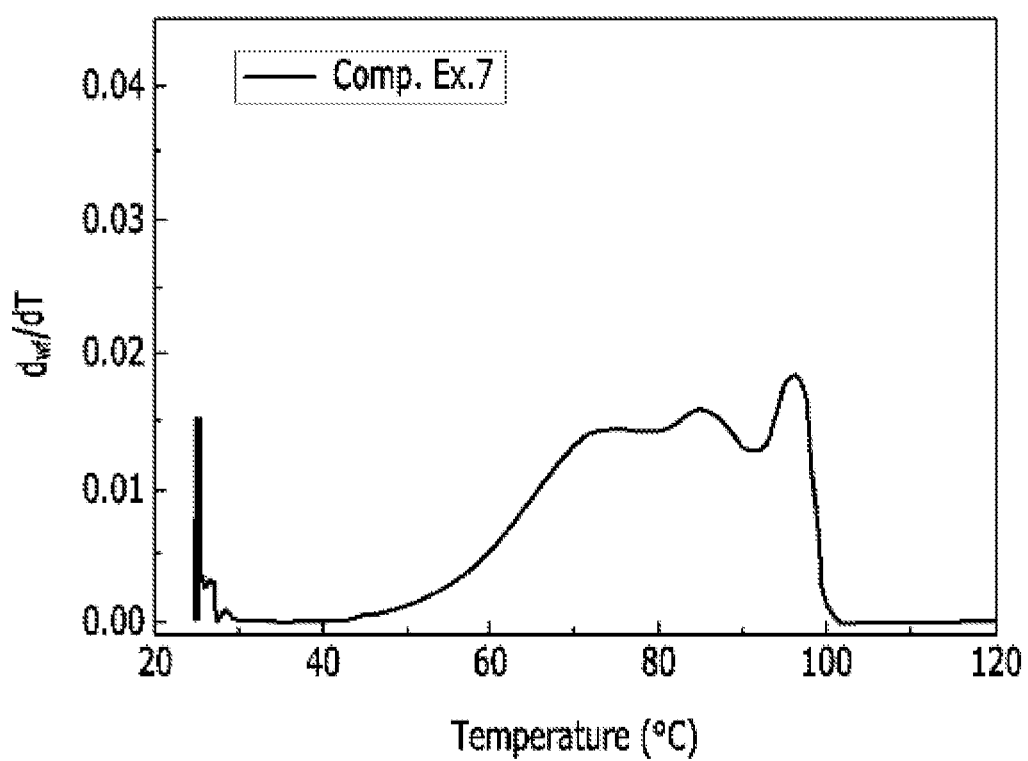

[FIG. 5]
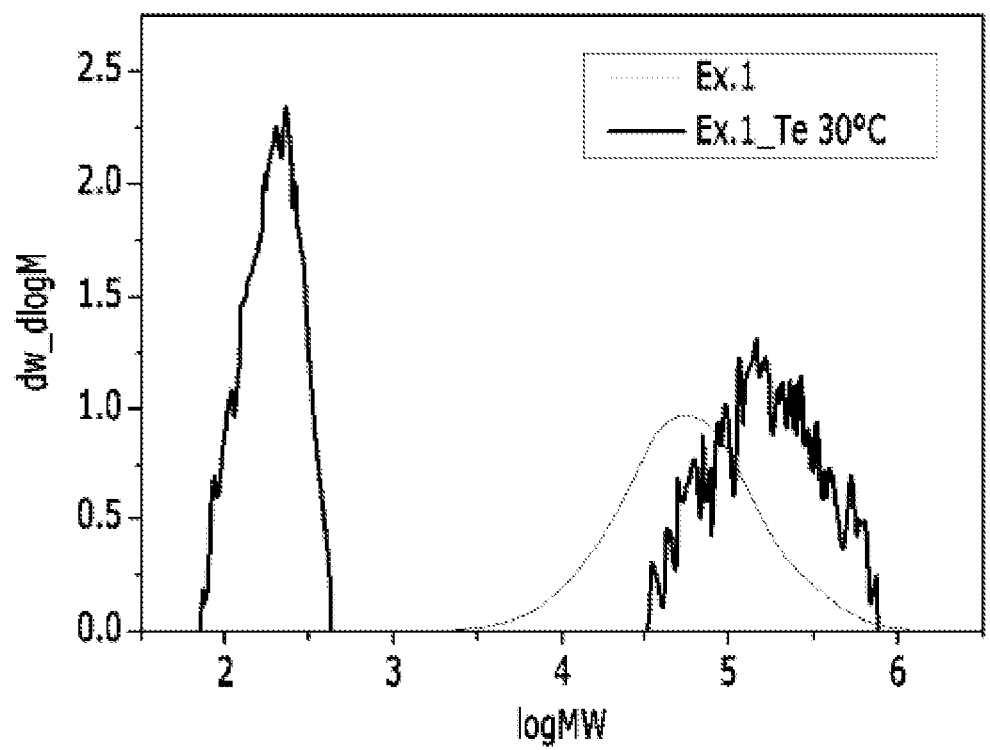

[FIG. 6]
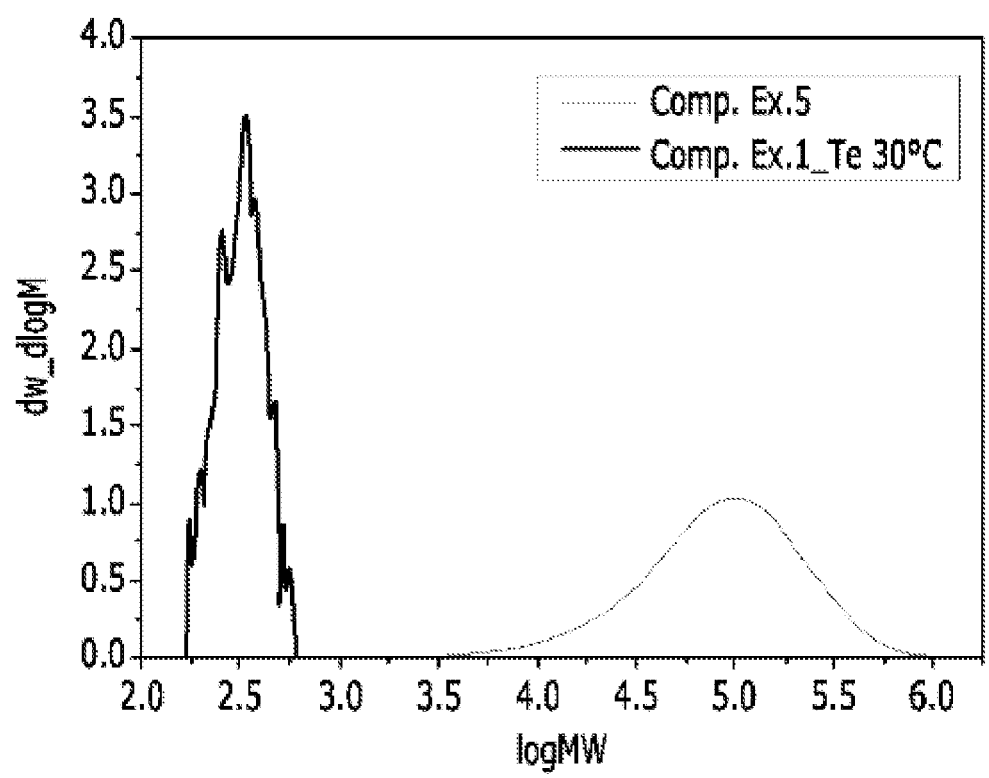

[FIG. 7]
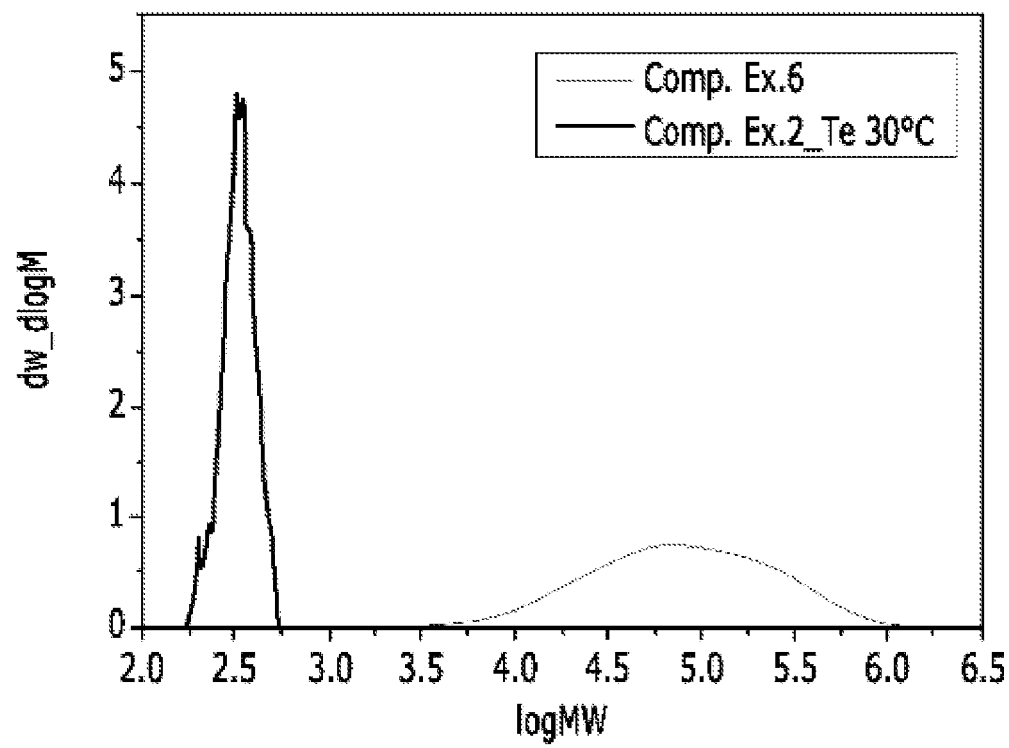

[FIG. 8]
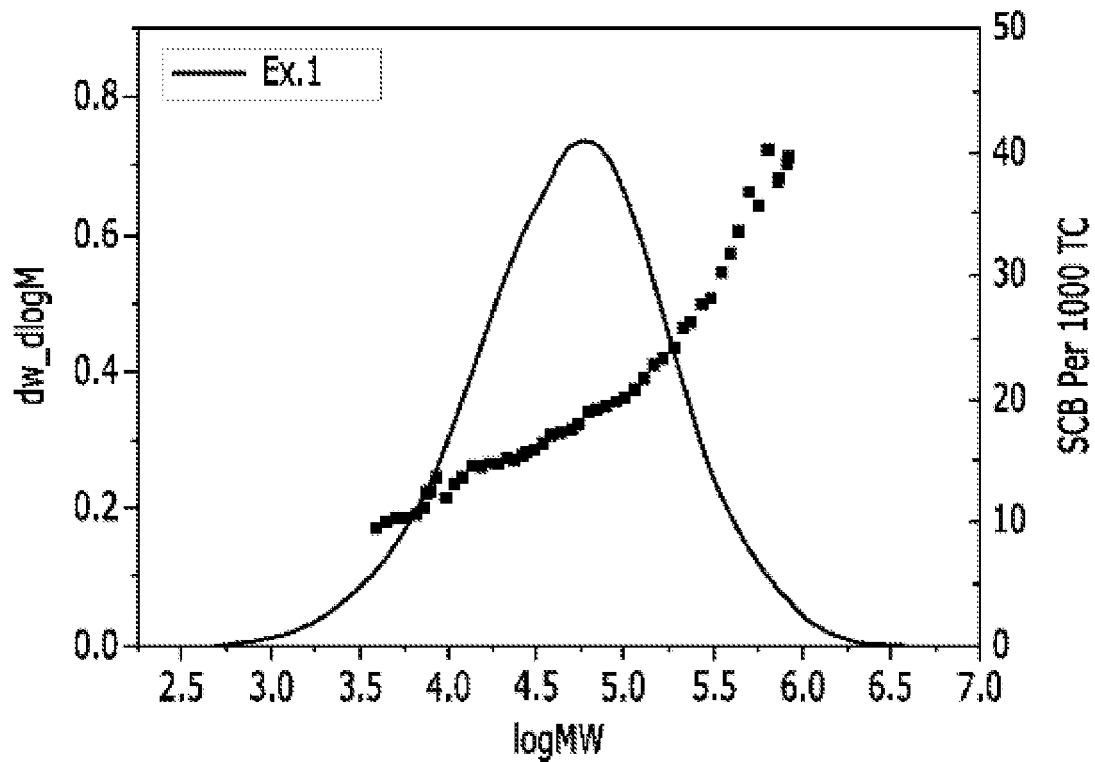

[FIG. 9]
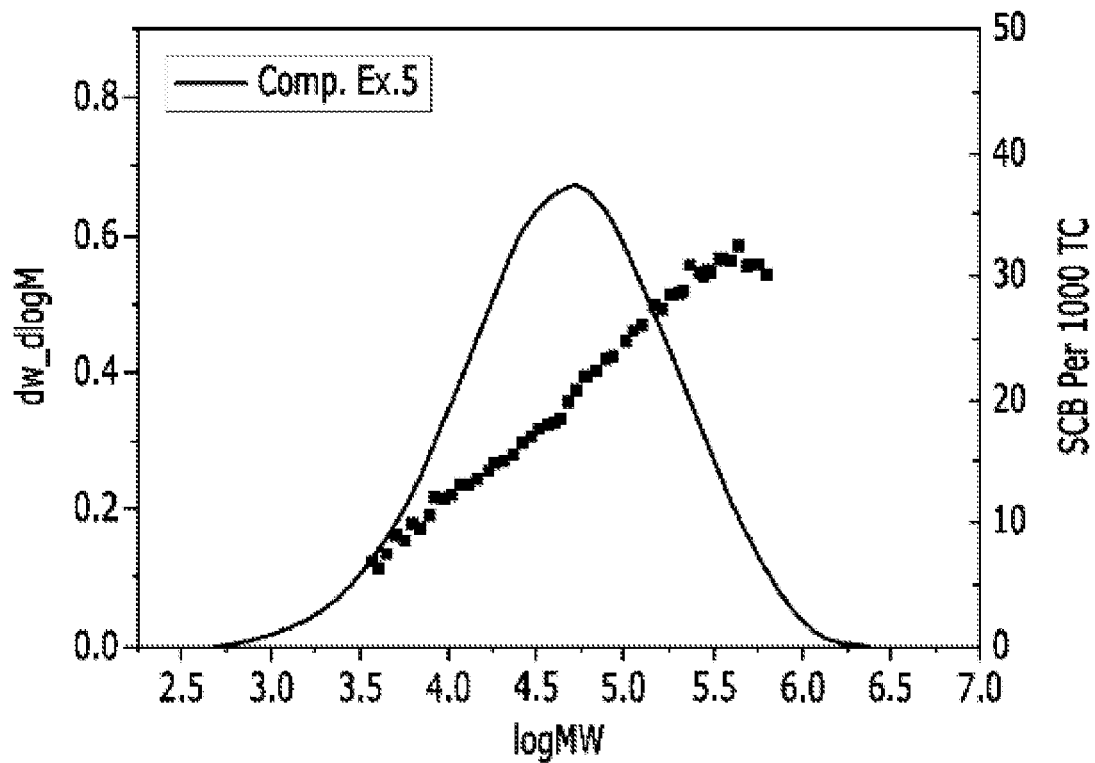

[FIG. 10]
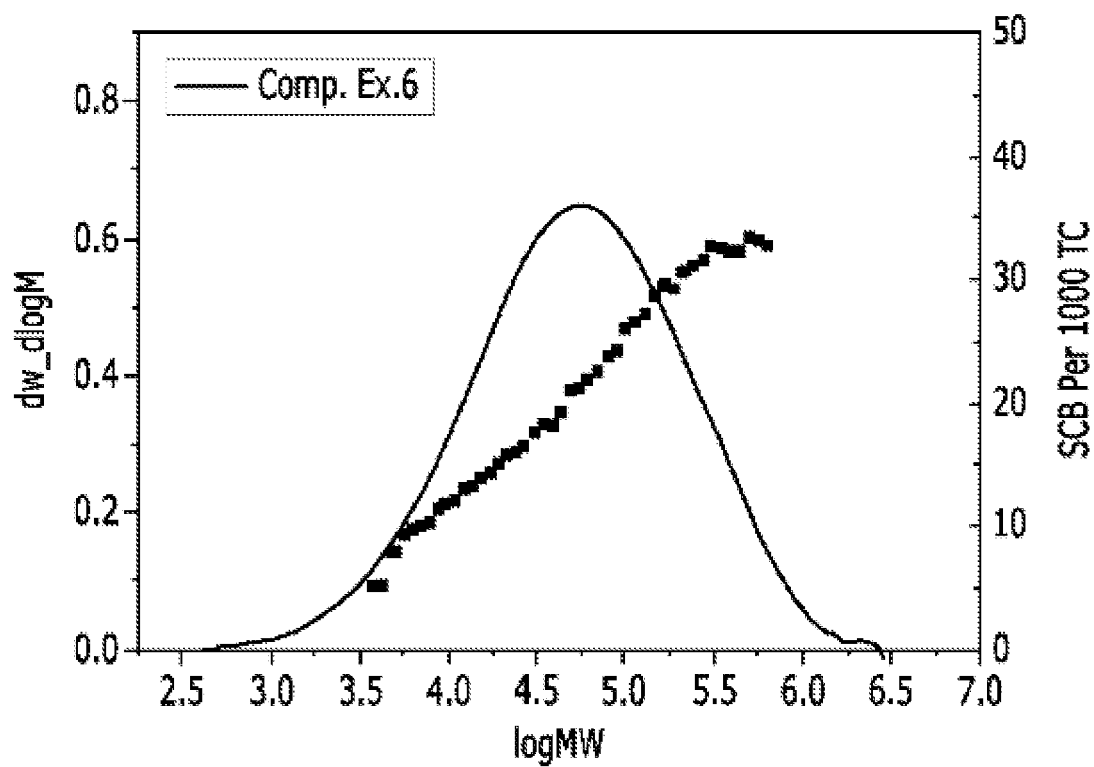

[FIG. 11]
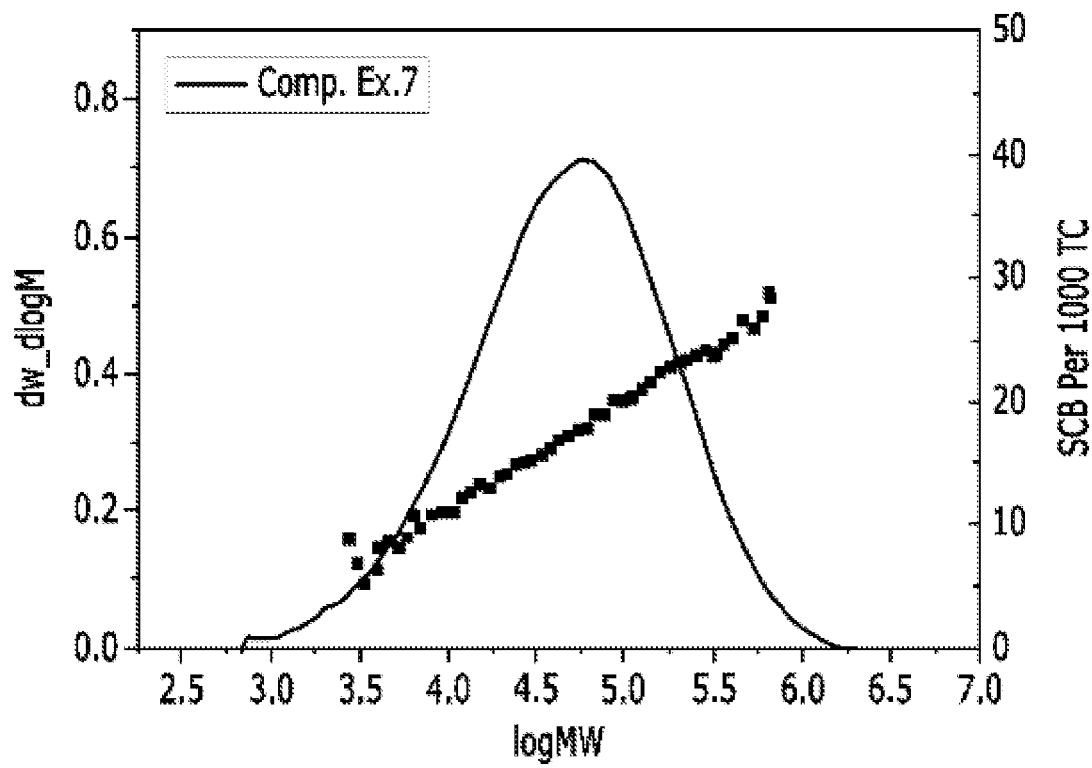

[FIG. 12]
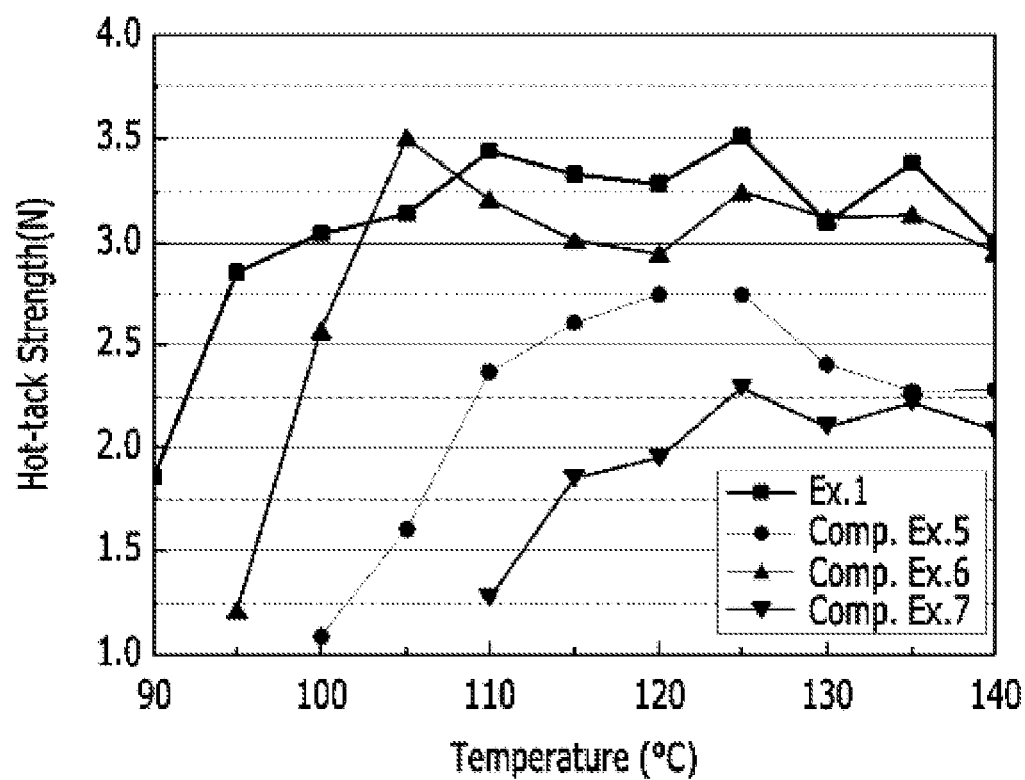

POLYETHYLENE AND METHOD FOR PREPARING THE SAME

CROSS-REFERENCE TO RELATED APPLICATION(S)

This present application is a national phase entry under 35 U.S.C. § 371 of International Application No. PCT/KR2020/013170 filed Sep. 28, 2020, which claims priority from Korean Patent Application No. 10-2019-0126480 filed Oct. 11, 2019, and Korean Patent Application No. 10-2020-0125237 filed Sep. 25, 2020, all of which are incorporated herein by reference in their entirety.

TECHNICAL FIELD

The present disclosure relates to a polyethylene having improved low-temperature sealing properties with an increase in the content and molecular weight of a low crystalline polymer, and a method for preparing the same.

BACKGROUND ART

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Publication No. 2004-0076965 discloses a method for controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts are departed from a supported component of the resulting catalyst to cause fouling in the reactor.

A linear low density polyethylene (LLDPE) is produced by copolymerizing ethylene and an α-olefin using a metallocene-based polymerization catalyst under low pressure, and it is a resin having a narrow molecular weight distribution and short chain branches (SCBs) of a certain length without a long chain branch (LCB). A LLDPE film has excellent mechanical properties such as breaking strength, elongation, tear strength, and dart impact strength in addition to the properties of a general polyethylene. Thus, it is increasingly used as a packaging film, which is a field where it is difficult to apply existing low density polyethylene or high density polyethylene.

In the case of a high-speed packaging film, it is required to increase hot-tack strength in order to increase productivity. However, the conventional linear low density polyethylene has a high melting temperature (Tm) and low low-temperature sealing strength. Accordingly, there is a problem in that the sealing property is deteriorated during high-speed processing and packaging materials flow out.

PRIOR ART DOCUMENTS

Patent Documents (Patent Document 1) U.S. Pat. No. 5,914,289
(Patent Document 2) Korean Patent Publication No. 2004-0076965

DETAILED DESCRIPTION OF THE INVENTION

Technical Problem

Accordingly, there are provided a polyethylene having improved low-temperature sealing properties with an increase in the content and molecular weight of a low crystalline polymer, and a method for preparing the same.

In addition, there is provided a film having excellent hot-tack strength by including the above polyethylene, and thus useful for high-speed packaging.

Technical Solution

According to an embodiment of the present disclosure, there is provided a polyethylene including an ethylene repeating unit and an α-olefin-based repeating unit,
  wherein the polyethylene has a density of 0.916 g/cm$^3$ or more, measured according to ASTM D1505, and has three elution temperatures of Te1, Te2, and Te3 corresponding to elution temperatures of first to third semicrystalline polymers, respectively, in a temperature range of 20 to 120° C. when analyzed by temperature rising elution fractionation (TREF),
  wherein Te2 is lower than Te3 and higher than Te1,
  Te1 is 25 to 30° C., and
  the first semicrystalline polymer has a weight average molecular weight of 200,000 g/mol or more, and is contained in an amount of 5 wt % or more based on a total weight of the polyethylene.

According to another embodiment of the present disclosure, there is provided a method for preparing the polyethylene, including the step of polymerizing an ethylene monomer and an α-olefin-based monomer having 3 or more carbon atoms in the presence of a catalyst composition containing a first transition metal compound represented by the following Chemical Formula 1 and a second transition metal compound represented by the following Chemical Formula 2 while introducing hydrogen gas into the reactor, wherein the hydrogen gas is introduced in an amount of 10 ppm or more and less than 200 ppm based on a total weight of the monomer including the ethylene monomer and the α-olefin-based monomer having 3 or more carbon atoms, and a molar ratio of the α-olefin-based monomer to the ethylene monomer (molar ratio of α-olefin-based monomer/ethylene monomer) present in the reactor is 0.25 or more during the polymerization reaction:

[Chemical Formula 1]

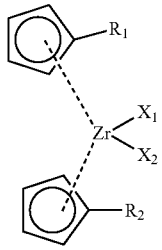

in Chemical Formula 1, $R_1$ and $R_2$ are each independently hydrogen, halogen, $C_{1-20}$ alkyl, $C_{2-20}$ alkenyl, $C_{1-20}$ alkoxy, $C_{2-20}$ alkoxyalkyl, $C_{6-20}$ aryl, $C_{7-20}$ alkylaryl, or $C_{7-20}$ arylalkyl, and $X_1$ and $X_2$ are each independently halogen or $C_{1-20}$ alkyl,

[Chemical Formula 2]

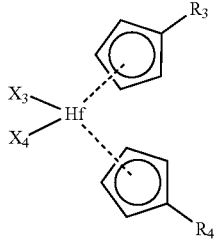

in Chemical Formula 2, $R_3$ and $R_4$ are each independently hydrogen, halogen, $C_{1-20}$ alkyl, $C_{2-20}$ alkenyl, $C_{1-20}$ alkoxy, $C_{2-20}$ alkoxyalkyl, $C_{6-20}$ aryl, $C_{7-20}$ alkylaryl, or $C_{7-20}$ arylalkyl, and $X_3$ and $X_4$ are each independently halogen or $C_{1-20}$ alkyl.

According to another embodiment of the present disclosure, there is provided a film including the above polyethylene, particularly a film for high-speed packaging.

Advantageous Effects

The polyethylene according to the present disclosure can exhibit improved low-temperature sealing properties by increasing the content and molecular weight of a low crystalline polymer. Accordingly, when applied to the production of a packaging film, particularly a high-speed packaging film, it exhibits excellent hot-tack properties, thereby increasing productivity.

BRIEF DESCRIPTION OF THE DRAWINGS

FIGS. 1 to 4 are graphs showing TREF (Temperature Rising Elution Fractionation) analysis results of the polyethylene prepared in Example 1 and Comparative Examples 5 to 7, respectively.

FIGS. 5 to 7 are graphs showing GPC (Gel Permeation Chromatography) analysis results of the first semicrystalline polymer in the polyethylene prepared in Example 1 and Comparative Examples 5 and 6, respectively.

FIGS. 8 to 11 are graphs showing SCB contents with respect to molecular weight of polyethylene obtained by GPC-FTIR (Gel Permeation Chromatography-Fourier-transform infrared spectroscopy) analysis results of the polyethylene prepared in Example 1 and Comparative Examples 5 to 7, respectively.

FIG. 12 is a graph showing the results of measuring low-temperature sealing strength of the polyethylene prepared in Example 1 and Comparative Examples 5 to 7.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In the present disclosure, the terminology "short chain branch (SCB)" in polyethylene refers to a chain branching from the longest main chain in each of the polymer chain, specifically a chain having 2 to 7 carbon atoms. The number of short chain branches can be determined by FT-IR analysis of the polymer, and may be proportional to the content of α-olefin-based monomer contained in the polymer chains.

Hereinafter, the polyethylene, the method for preparing the same, and the film using the same according to specific embodiments of the present disclosure will be described in more detail.

Specifically, the polyethylene according to an embodiment of the present disclosure is an ethylene/α-olefin-based copolymer including an ethylene repeating unit and an α-olefin-based repeating unit, wherein the polyethylene has a density of 0.916 g/cm³ or more, measured according to ASTM D1505, and has three elution temperatures of Te1, Te2, and Te3 corresponding to elution temperatures of first to third semicrystalline polymers, respectively, in a temperature range of 20 to 120° C. when analyzed by temperature rising elution fractionation (TREF), wherein Te2 is lower than Te3 and higher than Te1, Te1 is 25 to 30° C., and the first semicrystalline polymer has a weight average molecular weight of 200,000 g/mol or more, and is contained in an amount of 5 wt % or more based on a total weight of the polyethylene.

The present inventors have confirmed that using a specific catalyst composition to be described later and controlling a mixing ratio of the ethylene monomer and the comonomer and an amount of hydrogen input can provide a polyethylene having a density controlled to a certain level or higher, and exhibiting different crystal properties from the conventional one, thereby completing the present disclosure.

The crystal properties of the polyethylene were confirmed by TREF analysis. According to the analysis results, the polyethylene exhibits peaks in three different temperature ranges, which is distinguished from polymers generally showing only one peak in the same analysis.

More specifically, having first to third peaks means that fractions of polymer chains exhibiting different crystallinity, where a first fraction exhibiting the lowest crystallinity, a third fraction exhibiting the highest crystallinity, and a second fraction exhibiting crystallinity between the first and third fractions, are included in the polyethylene of the embodiment. As the first to third fractions of polymer chains exhibiting different crystallinity are included in the same manner as described above, the polyethylene of the embodiment may simultaneously improve all physical properties required for various uses. For example, the polyethylene can simultaneously improve compatibility with other resins, processability, strength and impact strength when compounded alone or with other resins. This may be because the polyethylene simultaneously includes polymer chains exhibiting different crystallinity.

In particular, it was confirmed that the polyethylene according to the embodiment of the present disclosure includes the first fraction exhibiting low crystallinity at a high fractional ratio, and polymer chains included in the first fraction have a high molecular weight. As a result, the polyethylene according to the embodiment can not only excellently express various physical properties at the same time, but also can significantly improve sealing strength at low temperatures. Accordingly, it can be particularly useful in manufacturing a high-speed packaging film that requires excellent hot-tack strength.

Meanwhile, in the present disclosure, the TREF analysis with respect to the polyethylene may be performed using a TREF apparatus manufactured by Polymer Char. Specifically, the polyethylene is dissolved in a solvent such as 1,2,4-trichlorobenzene to prepare a solution sample. Then, the prepared sample is introduced into a TREF column, and the initial temperature is lowered to 20° C. Thereafter, the temperature is increased to 120° C. at a constant temperature increase rate of 1° C./min, and a concentration of the eluted polymer is measured while flowing the 1,2,4-trichlorobenzene solvent in the column at a flowing rate of 0.5 mL/min. A more specific method thereof will be described in detail in the following Test Examples.

As a result of the above TREF analysis, it is possible to obtain a TREF elution curve expressed as an elution amount with respect to temperature (dW/dT), and first to third peaks corresponding to first to third fractions in the above-described temperature range can be confirmed. The first and third peaks mean that the polyethylene contains semicrystalline polymers corresponding to each peak.

In the present disclosure, the terminology "semicrystalline" designates a polymer having a first transition temperature, a crystalline melting temperature (Tm), an elution temperature, or the like measured by TREF, differential scanning calorimetry (DSC), or other equivalent technique. The density, the Tm, the elution temperature, and the like of the semicrystal may be dependent on the crystallinity thereof. The terminology "amorphous" designates a polymer having no crystalline melting temperature when measured by TREF, DSC, or other equivalent technique.

In addition, the temperature of the highest point of each peak in the TREF elution curve is the elution temperature (Te), and is expressed as Te1, Te2, and Te3, respectively. Te2 is lower than Te3 and higher than Te1. Specifically, Te1 is 25 to 30° C., Te2 is 40 to 65° C., and Te3 is 80 to 100° C.

The polyethylene according to the embodiment of the present disclosure includes first to third semicrystalline polymers corresponding to the first to third peaks and having different crystallinity.

Specifically, Te1 represents an elution temperature of the first semicrystalline polymer exhibiting low crystallinity, and is 25° C. or more, 27° C. or more, 28° C. or more, or 28.1° C. or more, and 30° C. or less, 29° C. or less, or 28.5° C. or less. In addition, Te2 represents an elution temperature of the second semicrystalline polymer exhibiting higher crystallinity than the first polymer, and is 40° C. or more, 50° C. or more, 60° C. or more, or 62° C. or more, and 65° C. or lower, 63° C. or less, or 62.5° C. or less. Since the elution temperature of the polymer chains exhibiting intermediate crystallinity, T2, is as low as 65° C. or less, a low crystalline polymer content is relatively high, so that the polyethylene can be quickly melted even at low temperatures, and as a result, the effect of improving low-temperature sealing properties can be achieved. In addition, Te3 represents an elution temperature of the third polymer having higher crystallinity than the second semicrystalline polymer, and is 80° C. or more, 90° C. or more, or 93° C. or more, and 100° C. or less, 95° C. or less, or 94° C. or less.

In addition, a fractional ratio (or content) of the first to third fractions of polymer chains exhibiting different crystallinity to the total polyethylene may be determined by integral areas of the first to third peaks and their ratios. Each of these integral areas may be derived by dividing the curve into first to third peak regions by a specific temperature region, and then calculating a lower area thereof. The fractional ratio of each fraction corresponding to each peak may be determined as a ratio of the integral area of each peak to the total area of each peak.

When analyzed by this method, the polyethylene of the embodiment has a fractional ratio of the first fraction defined as the integral area of the first peak of 5% or more, more specifically 10% or more, 11% or more, or 12% or more, and 20% or less, 15% or less, or 13% or less. That is, when converted based on the total weight of polyethylene, a content of the first semicrystalline polymer corresponding to the first fraction may be 5 wt % or more, more specifically 10 wt % or more, 11 wt % or more, or 12 wt % or more, and 20 wt % or less, 15 wt % or less, or 13 wt % or less. As described above, since the content of the first semicrystalline polymer having the lowest crystallinity in the polyethylene is high, the polyethylene can be rapidly melted at low temperatures, and thus exhibiting improved low-temperature sealing properties.

In addition, the first semicrystalline polymer exhibiting the lowest crystallinity in the polyethylene may have a weight average molecular weight (Mw) of 200,000 g/mol or more, more specifically 200,000 g/mol or more, more than 200,000 g/mol, 202,000 g/mol or more, or 205,000 g/mol or more, and 500,000 g/mol or less, 300,000 g/mol or less, 250,000 g/mol or less, 210,000 g/mol or less, or 206,000 g/mol or less. As it has such a high molecular weight, sealing strength may be improved even at low temperatures due to entanglement between polymer chains.

In addition, the number average molecular weight (Mn) of the first semicrystalline polymer may also be as high as 50,000 g/mol or more, more specifically 50,000 g/mol or more, 60,000 g/mol or more, or 70,000 g/mol or more, and 100,000 g/mol or less, 80,000 g/mol or less, 75,000 g/mol or less, or 73,000 g/mol or less. In addition, the first semicrystalline polymer may have a high molecular weight distribution (ratio of Mw/Mn) of 2 or more, 2.3 or more, 2.5 or more, 2.8 or more, or 2.82 or more, and 3 or less, 2.95 or less, or 2.93 or less.

Meanwhile, in the present disclosure, the weight average molecular weight, number average molecular weight, and molecular weight distribution of the first semicrystalline polymer may be measured by gel permeation chromatography (GPC), and a specific method thereof will be described in detail in the following Test Examples.

In addition, the polyethylene has a density of 0.916 g/cm$^3$ or more when measured according to ASTM D1505, along with the above-described crystal properties.

In general, the density of the olefin-based polymer is affected by the type and content of the monomers used in polymerization, the degree of polymerization, and the like, and the copolymer is highly affected by the content of comonomer. In the present disclosure, it is possible to introduce a large amount of comonomer by using a catalyst composition containing a transition metal compound having a specific structure. As a result, the polyethylene according to the embodiment of the present disclosure exhibits the density of 0.916 g/cm$^3$ or more, and thus, it may exhibit excellent mechanical properties and processability. More specifically, the polyethylene may exhibit the density of 0.916 g/cm$^3$ or more, and 0.920 g/cm$^3$ or less, or 0.918 g/cm$^3$ or less, and as a result, the effect of maintaining mechanical properties and improving impact strength may be further improved.

Further, the polyethylene has an average number of short chain branches (SCB) per 1000 carbons in the polymer in a high-molecular weight region having log Mw of 5.5 or more when analyzed by gel permeation chromatography combined with Fourier transform infrared spectroscopy (GPC-FTIR) of 35 or more, specifically 35 or more, 35.5 or more, 36 or more, or 36.5 or more, and 40 or less, 39 or less, 38.5 or less, or 38 or less. The high number of SCBs in the high-molecular weight region means that the polymers in the high-molecular weight region contain α-olefin-based repeating units at a higher content, and as a result, the polymers in the high-molecular weight region form low crystals to further improve the low-temperature sealing strength.

Moreover, the polyethylene may have an average number of short chain branches (SCBs) per 1000 carbons in the entire polymer of 18 or more, 19 or more, or 20 or more, and 22 or less, or 21.5 or less. Such a high number of SCBs means that the content of comonomer is high, and as a result, the low-temperature sealing strength can be improved even when the density is lowered.

In the present disclosure, the number of short chain branches (SCBs) in the high-molecular weight region having log Mw of 5.5 or more and the number of SCBs in the polyethylene are expressed as average values after calculating each value from the GPC-FTIR analysis results. A more specific method thereof will be described in detail in the following Test Examples.

In addition, the polyethylene may exhibit a narrow molecular weight distribution (MWD) of 3 or less, more specifically 2.75 or less, or 2.70 or less, and 2 or more, 2.5 or more, or 2.65 or more.

In general, having two or more Te in the TREF measurement means that two or more kinds of polymers having different branched chain contents are mixed. In addition, when two or more kinds of polymers are mixed, the molecular weight distribution increases, and as a result, impact strength and mechanical properties decrease and a blocking phenomenon occurs. However, the polyethylene of the present disclosure has a narrow molecular weight distribution while having three Te, thus exhibiting excellent impact strength and mechanical properties.

Further, the polyethylene may have a number average molecular weight (Mn) of 35,000 g/mol or more, 40,000 g/mol or more, 42,000 g/mol or more, or 43,000 g/mol or more, and 50,000 g/mol or less, 45,000 g/mol or less, or 44,000 g/mol or less, and a weight average molecular weight (Mw) of 100,000 g/mol or more, 110,000 g/mol or more, or 112,000 g/mol or more, and 130,000 g/mol or less, 120,000 g/mol or less, 115,000 g/mol or less, or 114,000 g/mol or less, while satisfying the above-described molecular weight distribution.

Meanwhile, the weight average molecular weight (Mw) and the number average molecular weight (Mn) are molecular weights converted with polystyrene by gel permeation chromatography (GPC), and the molecular weight distribution (MWD) can be calculated from the ratio of Mw/Mn. The specific method will be described in detail in the following Test Examples.

Further, the polyethylene may satisfy any one or more, two or more, three or more, four or more, or all five conditions of the following conditions (i) to (v):
(i) Melt index measured at 190° C. under a load of 2.16 kg according to ASTM D-1238: 0.8 to 2 g/10 min,
(ii) Melting temperature: 120 to 125° C.,
(iii) Crystallization temperature: 100 to 110° C.,
(iv) Heat of fusion in a temperature range of 0 to 130° C.: 99.5 to 120 J/g, and
(v) Seal initiation temperature under a 2N condition is 95° C. or less and hot-tack strength at 100° C. is 3.0 N or more, when measured according to ASTM F1921.

Specifically, the polyethylene may have a melt index (MI) of 0.8 g/10 min or more, 0.9 g/10 min or more, or 1 g/10 min or more and 2 g/10 min or less, 1.8 g/10 min or less, or 1.5 g/10 min or less, when measured according to ASTM D-1238 (condition E, 190° C., under a load of 2.16 kg). When having the melt index in an optimum range together with the density in the above range, the polyethylene may exhibit improved processability while maintaining excellent mechanical properties.

In addition, the polyethylene may have a high melting temperature of 120 to 125° C., thereby exhibiting excellent heat resistance. Specifically, the polyethylene may have a melting temperature (Tm) of 120° C. or more, and 125° C. or less, or 122° C. or less when measured by DSC.

In addition, the polyethylene may have a crystallization temperature (Tc) of 100° C. or more, and 110° C. or less, 105° C. or less, or 103° C. or less. This high crystallization temperature is due to the uniform distribution of comonomers in the polyethylene, and excellent structural stability may be exhibited by having the crystallization temperature within the above-described range.

In addition, the polyethylene may have a heat of fusion (ΔH) of 99.5 J/g or more, 100.0 J/g or more, or 105 J/g or more, and 120 J/g or less, or 115 J/g or less, wherein the heat of fusion is an integral value of the peak observed in the temperature range of 0 to 130° C. in the graph obtained by performing DSC in the temperature range of −50 to 190° C. Accordingly, it can exhibit excellent heat resistance.

In the present disclosure, the melting temperature (Tm), crystallization temperature (Tc), and heat of fusion (ΔH) of the polyethylene can be measured using differential scanning calorimeter (DSC), and a more specific method thereof will be described in detail in the following Test Examples.

Meanwhile, the above-described polyethylene may be a copolymer including an ethylene-based repeating unit and an α-olefin-based repeating unit. Herein, the α-olefin-based repeating unit may be a repeating unit derived from a C3 to C20 α-olefin such as 1-butene, 1-pentene, 4-methyl-1-pentene, 1-hexene, 1-heptene, 1-octene, 1-decene, 1-undecene, 1-dodecene, 1-tetradecene or 1-hexadecene. Considering excellent impact strength of the polyethylene, a repeating unit derived from 1-hexene may be suitable.

The polyethylene of the above-described embodiment may exhibit excellent low-temperature sealing strength. Specifically, the polyethylene has a low seal initiation temperature (SIT) of 95° C. or less, 93° C. or less, or 90° C. or less, and high hot-tack strength at 100° C. of 3.0 N or more, or 3.2 N or more, when measured according to ASTM F1921.

Accordingly, it can be usefully used for blow molding, extrusion molding or injection molding in various fields and uses such as various packaging, construction, and household goods, e.g., materials for automobiles, shoes, wires, toys, textiles, and medical supplies, and is particularly useful as a high-speed packaging film.

Meanwhile, it was confirmed that the above-described polyethylene can be prepared by a preparation method using a specific catalyst system to be described later. According to another embodiment of the present disclosure, there is provided a method for preparing the above-described polyethylene, including the step of polymerizing an ethylene monomer and an α-olefin-based monomer having 3 or more carbon atoms in the presence of a catalyst composition containing a first transition metal compound represented by the following Chemical Formula 1 and a second transition metal compound represented by the following Chemical Formula 2, wherein the hydrogen gas is introduced in an amount of 10 ppm or more and less than 200 ppm based on a total weight of the monomer including the ethylene monomer and the α-olefin-based monomer having 3 or more carbon atoms, and a molar ratio of the α-olefin-based monomer to the ethylene monomer (molar ratio of α-olefin-based monomer/ethylene monomer) present in the reactor is 0.25 or more during the polymerization reaction:

[Chemical Formula 1]

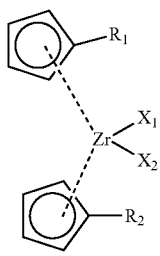

in Chemical Formula 1,
$R_1$ and $R_2$ are each independently hydrogen, halogen, $C_{1-20}$ alkyl, $C_{2-20}$ alkenyl, $C_{1-20}$ alkoxy, $C_{2-20}$ alkoxyalkyl, $C_{6-20}$ aryl, $C_{7-20}$ alkylaryl, or $C_{7-20}$ arylalkyl, and $X_1$ and $X_2$ are each independently halogen or $C_{1-20}$ alkyl,

[Chemical Formula 2]

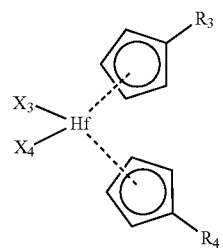

in Chemical Formula 2,
$R_3$ and $R_4$ are each independently hydrogen, halogen, $C_{1-20}$ alkyl, $C_{2-20}$ alkenyl, $C_{1-20}$ alkoxy, $C_{2-20}$ alkoxyalkyl, $C_{6-20}$ aryl, $C_{7-20}$ alkylaryl, or $C_{7-20}$ arylalkyl, and $X_3$ and $X_4$ are each independently halogen or $C_{1-20}$ alkyl.

In the transition metal compound contained in the catalyst composition according to the embodiment, the substituents in Chemical Formulae 1 and 2 will be described in more detail as follows.

The halogen may be fluorine (F), chlorine (Cl), bromine (Br) or iodine (I).

The $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. More specifically, the $C_{1-20}$ alkyl may be methyl, ethyl, n-propyl, iso-propyl, n-butyl, iso-butyl, tert-butyl, n-pentyl, iso-pentyl, cyclohexyl, or the like.

The $C_{2-20}$ alkenyl may be linear, branched, or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl or $C_{5-10}$ cyclic alkenyl. More specifically, it may be ethenyl, propenyl, butenyl, pentenyl, cyclohexenyl, or the like.

The $C_{6-20}$ aryl may be a monocyclic, bicyclic or tricyclic aromatic hydrocarbon. Specifically, the $C_{6-20}$ aryl may be phenyl, naphthyl, anthracenyl, or the like.

The $C_{7-20}$ alkylaryl may refer to a substituent in which at least one hydrogen of aryl is substituted with alkyl. Specifically, the $C_{7-20}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-20}$ arylalkyl may refer to a substituent in which at least one hydrogen of alkyl is substituted with aryl. Specifically, the $C_{7-20}$ arylalkyl may be benzyl, phenylpropyl, phenylhexyl, or the like.

The $C_{1-20}$ alkoxy may be linear, branched, or cyclic alkoxy. Specifically, the $C_{1-20}$ alkoxy may be methoxy, ethoxy, n-butoxy, tert-butoxy, phenyloxy, cyclohexyloxy, or the like, but is not limited thereto.

The $C_{2-20}$ alkoxyalkyl may refer to a substituent in which at least one hydrogen of alkyl is substituted with alkoxy. Specifically, the $C_{2-20}$ alkoxyalkyl may be methoxymethyl, ethoxymethyl, methoxyethyl, ethoxyethyl, butoxymethyl, butoxyethyl, butoxypropyl, butoxybutyl, butoxyheptyl, butoxyhexyl, or the like, but is not limited thereto.

In the catalyst composition according to the embodiment, $R_1$ and $R_2$ in Chemical Formula 1 are the same as or different from each other, and each independently $C_{4-20}$ or $C_{4-12}$ linear alkyl; or $C_{5-12}$ or $C_{6-10}$ linear alkyl substituted with tert-butoxy. $X_1$ and $X_2$ are the same as or different from each other, and each independently halogen such as chloro; or $C_{1-4}$ linear alkyl such as methyl.

More preferably, in Chemical Formula 1, both $R_1$ and $R_2$ may be $C_{6-10}$ linear alkyl substituted with tert-butoxy, or n-hexyl substituted with tert-butoxy, and both $X_1$ and $X_2$ may be $C_{1-4}$ linear alkyl or methyl.

Specifically, the first transition metal compound represented by the Chemical Formula 1 may be a compound represented by the following Chemical Formula 1a or Chemical Formula 1b, but is not limited thereto.

[Chemical Formula 1a]

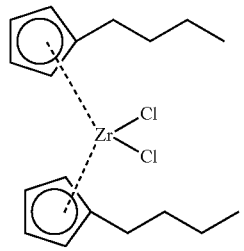

[Chemical Formula 1b]

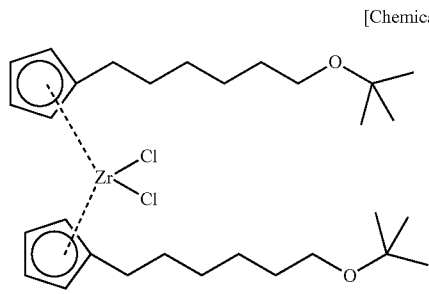

The first transition metal compound represented by the above structural formulae may be synthesized by applying known reactions, and the synthesis method can be referred to Examples.

In the catalyst composition according to the embodiment, $R_3$ and $R_4$ in Chemical Formula 1 are the same as or different from each other, and each independently $C_{3-12}$ linear alkyl such as n-propyl, n-butyl, n-pentyl, or n-hexyl. $X_3$ and $X_4$ are the same as or different from each other, and each independently $C_{1-4}$ linear alkyl such as methyl or ethyl.

More preferably, in Chemical Formula 2, both $R_3$ and $R_4$ may be $C_{4-6}$ linear alkyl, and both $X_3$ and $X_4$ may be $C_{1-4}$ linear alkyl or methyl.

Specifically, the second transition metal compound represented by the Chemical Formula 2 may be a compound represented by the following Chemical Formula 2a or Chemical Formula 2b, but is not limited thereto.

[Chemical Formula 2a]

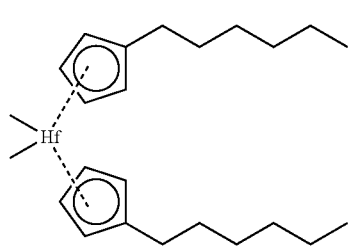

[Chemical Formula 2b]

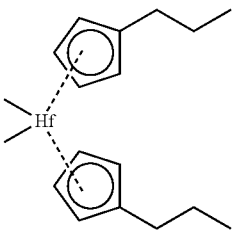

The second transition metal compound represented by the above structural formulae may be synthesized by applying known reactions, and the synthesis method can be referred to Examples.

In the catalyst composition according to the embodiment, the first transition metal compound represented by the Chemical Formula 1 contributes to preparing a low molecular weight linear copolymer, and the second transition metal compound represented by the Chemical Formula 2 contributes to preparing a high molecular weight linear copolymer. The catalyst composition may exhibit excellent supporting performance, catalytic activity, and high comonomer incorporation by using the first transition metal compound having low comonomer incorporation and the second transition metal compound having high comonomer incorporation as a hybrid catalyst. Particularly, when an ultra-low density polyethylene is produced in a slurry process in the presence of the catalyst composition, stability is improved in the process, and thus fouling problems that have occurred in the prior art can be prevented. In addition, a polyethylene having excellent physical properties may be provided by using the catalyst composition.

Further, in the catalyst composition, controlling a mixing molar ratio of the first transition metal compound and the second transition metal compound may improve catalytic activity and comonomer incorporation, and easily implement the molecular structure and physical properties of the polyethylene. Specifically, the mixing molar ratio (A:B) of the first transition metal compound (A) and the second transition metal compound (B) may be 1:0.3 to 1:3.5. When contained in the above molar ratio, high catalytic activity and comonomer incorporation may be exhibited, and as a result, the structure and physical properties of the polyethylene as described above may be more easily implemented. In particular, when an ultra-low density polyethylene is produced in a slurry process under the catalyst composition, the problems of poor productivity and fouling caused by melting or swelling of the conventional ultra-low density polyethylene can be solved, thereby exhibiting excellent stability in the process.

If the molar ratio (A:B) of the first transition metal compound and the second transition metal compound is less than 1:0.3, it may be difficult to prepare an ultra-low density polyethylene due to poor comonomer incorporation. If the molar ratio exceeds 1:3.5, it may be difficult to implement the desired molecular structure of the polymer. More specifically, the molar ratio (A:B) of the first transition metal compound and the second transition metal compound in the catalyst composition may be 1:0.5 to 1:2, or 1:1 to 1:1.5.

Meanwhile, the catalyst composition may further include at least one of a support and a cocatalyst.

Specifically, the catalyst composition may further include a support supporting the first transition metal compound and the second transition metal compound. When the catalyst composition is used in the form of a supported catalyst, it is possible to further improve morphology and physical properties of the polyethylene to be prepared, and it may be suitably used for slurry polymerization, bulk polymerization, and gas phase polymerization.

Specifically, a support having a highly reactive hydroxyl group, silanol group or siloxane group on the surface after removing moisture that interferes with the support of the transition metal compound from the surface may be preferably used. The support may be surface-modified by calcination before use, or may be dried. For example, the support may be silica prepared by calcining silica gel, silica dried at high temperatures, silica-alumina, silica-magnesia, or the like, and it may usually contain oxides, carbonates, sulfates, or nitrates such as $Na_2O$, $K_2CO_3$, $BaSO_4$, $Mg(NO_3)_2$ and the like.

The support is preferably calcined or dried at 200 to 600° C., more preferably 250 to 600° C. If the temperature is 200° C. or less, the support contains too much moisture, so that the moisture on the surface may react with the cocatalyst. In addition, a cocatalyst supporting ratio may be relatively high due to excess hydroxyl groups, but this requires a large amount of cocatalyst. If the temperature is higher than 600° C., pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

The amount of hydroxyl groups may be controlled by the preparation method, the preparation conditions, or the drying conditions such as temperature, time, vacuum or spray drying of the support. If the amount of hydroxyl groups is excessively low, reactive sites with cocatalyst may be insufficient. If the amount of hydroxyl groups is excessively high, it may be caused by moisture besides the hydroxyl groups present on the surface of support particles, which is not desirable. For example, the amount of hydroxyl groups on the surface may be 0.1 to 10 mmol/g, or 0.5 to 5 mmol/g.

Among the above-mentioned supports, the silica has little catalyst released from the surface of the support in the copolymerization process, because the transition metal compound is chemically bonded to and supported on the silica support. As a result, when the polyethylene is prepared by slurry polymerization or gas phase polymerization, a fouling phenomenon, sticking to the wall surface of the reactor or with each other, may be minimized.

When the catalyst composition is used in the form of a supported catalyst, the content of the first and second transition metal compounds may be 10 μmol or more, or 30 μmol or more, and 500 μmol or less, or 100 μmol or less based on a weight of the support, for example, 1 g of silica. When supported within the above content range, the supported catalyst may exhibit appropriate activity, which is advantageous in terms of maintaining catalytic activity and economical efficiency.

In addition, the catalyst composition may further contain a cocatalyst to activate the transition metal compound which is a catalyst precursor. The cocatalyst is an organometallic compound containing a Group 13 metal, and is not particularly limited as long as it can be used when polymerizing olefins in the presence of a general metallocene catalyst. Specifically, the cocatalyst may be at least one compound selected from the group consisting of compounds represented by the following Chemical Formulae 3 to 5.

$$-[Al(R_{11})-O]_m- \qquad \text{[Chemical Formula 3]}$$

in Chemical Formula 3,
$R_{11}$ are the same as or different from each other, and each independently halogen; a $C_{1-20}$ hydrocarbon; or a $C_{1-20}$ halogen-substituted hydrocarbon; and
m is an integer of 2 or more;

$$J(R_{12})_3 \qquad \text{[Chemical Formula 4]}$$

in Chemical Formula 4,
$R_{12}$ are the same as or different from each other, and each independently halogen; a $C_{1-20}$ hydrocarbon; or a $C_{1-20}$ halogen-substituted hydrocarbon; and
J is aluminum or boron;

$$[E-H]^+[ZQ_4]^- \text{ or } [E]^+[ZQ_4]^- \qquad \text{[Chemical Formula 5]}$$

in Chemical Formula 5,
E is a neutral or cationic Lewis base;
H is a hydrogen atom;
Z is a Group 13 element; and
Q are the same as or different from each other, and each independently a $C_{6-20}$ aryl or $C_{1-20}$ alkyl group, of which one or more hydrogen atoms are substituted or unsubstituted with halogen, a $C_{1-20}$ hydrocarbon, alkoxy, or phenoxy.

Examples of the compound represented by Chemical Formula 3 may include a $C_{1-20}$ alkylaluminoxane-based compound such as methylaluminoxane, ethylaluminoxane, isobutylaluminoxane, butylaluminoxane, and the like, and any one or a mixture thereof may be used.

Examples of the compound represented by Chemical Formula 4 may include a $C_{1-20}$ alkylaluminoxane-based compound such as methylaluminoxane, ethylaluminoxane, isobutylaluminoxane, butylaluminoxane, and the like, and any one or a mixture thereof may be used.

Examples of the compound represented by Chemical Formula 5 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

In order to exhibit better catalytic activity when used with the transition metal compound, the cocatalyst may be the compound represented by the Chemical Formula 3, more specifically the $C_{1-20}$ alkylaluminoxane-based compound such as methylaluminoxane. The alkylaluminoxane-based compound acts as a scavenger of a hydroxyl group present on the surface of the support to improve the catalytic activity and to convert the halogen group of the catalyst precursor to a methyl group, thereby promoting chain growth in the polymerization of a polyethylene.

The cocatalyst may be supported in an amount of 0.1 g or more, or 0.5 g or more, and 20 g or less, or 10 g or less based on a weight of the support, for example, 1 g of silica. When supported within the above content range, it is possible to obtain an effect of improving catalytic activity as well as an effect of reducing the generation of fine particles.

In addition, when the catalyst composition contains both the support and the cocatalyst, it may be prepared by a method including the steps of: supporting a cocatalyst compound on a support; and supporting the above transition metal compound on the support. Herein, the first transition metal compound is supported and then the second transition metal compound is supported, or vice versa. The supported catalyst having a structure determined according to the above supporting order may exhibit superior catalytic activity and excellent process stability in the preparation of a polyethylene.

The catalyst composition may be used in a slurry state or in a diluted state in a solvent, or in the form of a mud catalyst mixed with a mixture of oil and grease depending on the polymerization method.

When used in a slurry state or in a diluted state in a solvent, the solvent may be an aliphatic hydrocarbon solvent having 5 to 12 carbon atoms such as pentane, hexane, heptane, nonane, decane, and an isomer thereof, an aromatic hydrocarbon solvent such as toluene, and benzene, or a hydrocarbon solvent substituted with chlorine such as dichloromethane, and chlorobenzene, which is suitable for the polymerization of propylene monomers. Any one or a mixture thereof may be used. In this case, the catalyst composition may further include the above-mentioned solvent, and a small amount of water or air, which can act as a catalyst poison, may be removed by treating the solvent with a small amount of alkylaluminum in advance.

Meanwhile, the polymerization process may be carried out by a continuous polymerization process. For example, various polymerization processes known as the polymerization of olefin-based monomers such as a continuous solution polymerization process, a bulk polymerization process, a suspension polymerization process, a slurry polymerization process or an emulsion polymerization process may be applied.

Specifically, the polymerization reaction for preparing a polyethylene may be performed by copolymerizing an ethylene monomer with an α-olefin-based monomer as a comonomer using a continuous slurry polymerization reactor, a loop slurry reactor, or the like. However, according to the method of the embodiment, a continuous bulk-slurry polymerization or a gas phase polymerization is more appropriate in order to more effectively control the molecular weight distribution. In particular, the polymerization reaction may be performed by a slurry phase polymerization in a hydrocarbon-based solvent (for example, an aliphatic hydrocarbon-based solvent such as hexane, butane, or pentane). As the first and second transition metal compounds according to the present disclosure have excellent solubility in aliphatic hydrocarbon-based solvents, they are stably dissolved and supplied to the reaction system, and thus the polymerization reaction can be effectively performed.

Specifically, the α-olefin-based monomer may be propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, or the like, and 1-hexene is preferable. Thus, in the slurry polymerization, the ethylene and 1-hexene may be polymerized to prepare an ultra-low density polyethylene.

Meanwhile, during the polymerization reaction, a molar ratio of α-olefin-based monomer/ethylene monomer in the reactor is 0.25 or more.

The molar ratio of the monomers introduced into the reactor before the polymerization reaction and the molar ratio of the monomers present in the reactor during the polymerization reaction may vary depending on catalytic reactivity. In the present disclosure, the molar ratio of ethylene monomer and α-olefin-based monomer present (or remaining) in the reactor is controlled within the above range during the polymerization reaction, so that the resulting copolymer has the above crystal structure and physical properties, especially a density of 0.916 g/cm$^3$ or more, thereby exhibiting sufficient stiffness. However, if the molar ratio of α-olefin-based monomer/ethylene monomer is less than 0.25, it is difficult to manufacture a polyethylene having the above-described crystal structure and physical properties. More specifically, the molar ratio of α-olefin-based monomer/ethylene monomer in the reactor may be 0.25 or more, or 0.26 or more, and 0.3 or less, 0.28 or less, or 0.27 or less, and in this case, the density of the copolymer is maintained in the range of 0.916 to 0.920 g/cm$^3$, exhibiting better stiffness.

Meanwhile, the molar ratio of ethylene monomer and α-olefin-based monomer in the reactor can be calculated after measuring the respective concentrations using gas chromatograph. The specific method thereof will be described in detail in the following Test Examples.

In addition, the polymerization may be performed at a temperature of 70 to 200° C. If the polymerization temperature is less than 70° C., a polymerization rate and productivity may be reduced. Conversely, if the polymerization temperature is more than 200° C., a fouling phenomenon may occur in the reactor. In order to easily achieve the physical properties of the polyethylene, the polymerization reaction may be performed at a temperature of 80° C. or more and 150° C. or less.

In addition, a polymerization pressure may be 20 to 50 bar to ensure optimum productivity. It is possible to prepare a polyethylene with better efficiency within the above range. More specifically, it can be performed at a pressure of 20 bar or more and 40 bar or less.

In addition, during the polymerization reaction, hydrogen gas may be introduced for the purpose of controlling the molecular weight and molecular weight distribution of the polyethylene. At this time, the hydrogen gas functions to suppress the rapid reaction of the transition metal compound at the initial stage of polymerization and terminate the polymerization reaction. Accordingly, by controlling the use and amount of hydrogen gas, a polyethylene having the above molecular structure and physical properties can be effectively prepared.

The hydrogen gas may be introduced in an amount of 10 ppm or more and less than 200 ppm based on a total weight of the monomer including ethylene and α-olefin.

When introduced under the above-described conditions, the ethylene/α-olefin polymer to be prepared can have the physical properties of the present disclosure. If less than 10 ppm of the hydrogen gas is introduced, the polymerization reaction is not uniformly terminated, making it difficult to prepare a polyethylene having desired properties. In addition, if more than 200 ppm of the hydrogen gas is introduced, the termination reaction occurs too quickly, and there is a concern that a polyethylene having an excessively low molecular weight may be prepared. More specifically, the hydrogen gas may be introduced in an amount of 10 ppm or more, or 15 ppm or more, and 180 ppm or less, 150 ppm or less, 100 ppm or less, 50 ppm or less, or 30 ppm or less based on the total weight of the monomer.

In addition, trialkylaluminum such as triethylaluminum may be selectively added during the polymerization reaction.

When moisture or impurities are present in the polymerization reactor, a part of the catalyst decomposes. Since the trialkylaluminum acts as a scavenger which preliminarily captures moisture or impurities present in the reactor or moisture contained in the monomer, activity of the catalyst used in the preparation may be maximized, and as a result, a homo polyethylene having excellent properties such as a narrow molecular weight distribution can be prepared more efficiently. Specifically, alkyl of the above-mentioned trialkylaluminum is as defined above, and may be $C_{1-20}$ alkyl, more specifically $C_{1-6}$ linear or branched alkyl such as methyl, ethyl, isobutyl and the like. The trialkylaluminum (based on 1M) may be added in an amount of 300 ppm or more, or 400 ppm or more and 600 ppm or less, or 500 ppm or less based on the total weight of the monomer including ethylene and α-olefin. A homo polyethylene having excellent strength properties may be more easily prepared in the polymerization reaction in the presence of trialkylaluminum within the above-mentioned range.

In addition, an organic solvent may be further used in the polymerization reaction as a reaction medium or a diluent. The organic solvent may be used in an amount such that a slurry phase polymerization may be appropriately performed considering the amount of olefin-based monomer.

The polyethylene prepared by the above-described method may exhibit improved low-temperature sealing properties with an increase in the content and molecular weight of the low crystalline polymer, and may exhibit increased hot-tack sealing properties when used as a packaging film.

According to another embodiment of the present disclosure, a film, more specifically a high-speed packaging film, including the above-described polyethylene is provided.

The film may be prepared and used according to a conventional method, except that the above-described polyethylene is included as a main component.

Hereinafter, preferred examples will be described in order to facilitate understanding of the present invention. However, these examples are provided to facilitate understanding of the present invention, and the invention is not intended to be limited thereto.

<Preparation of Supported Hybrid Catalyst>

Synthesis Example 1

Silica (SP952 manufactured by Grace Davison) was dehydrated and dried at a temperature of 200° C. for 12 hours under vacuum.

After adding 3.0 kg of a toluene solution in a 20 L sus high-pressure reactor, 1000 g of the dried silica (SP952 manufactured by Grace Davison) was added thereto, and the reactor was stirred while raising the temperature to 40° C. After sufficiently dispersing the silica for 60 minutes, 8 kg of a 10 wt % methylaluminoxane (MAO)/toluene solution was added, followed by stirring at 200 rpm for 12 hours. After raising the temperature of the reactor to 60° C., 0.01 mmol of the compound represented by Chemical Formula 1b was dissolved to become a solution state, and added to the reactor, followed by reaction for 2 hours. Thereafter, 0.01 mmol of the compound represented by Chemical Formula 2a was dissolved to become a solution state and added to the reactor, followed by further reaction for 2 hours. Thereafter, the stirring was stopped, followed by settling for 30 minutes and then decantation of the reaction solution. After adding 3.0 kg of hexane to the reactor, the hexane slurry was transferred to filter dry, and the hexane solution was filtered. It was dried under reduced pressure at 50° C. for 4 hours to prepare a supported catalyst.

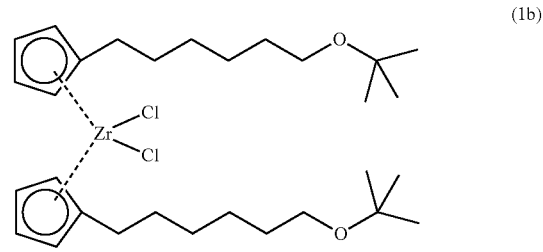

(1b)

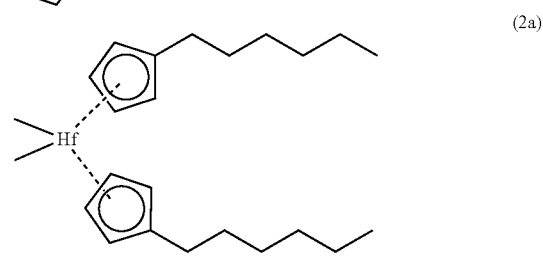

(2a)

Synthesis Example 2

0.14 mol of tBu-O—$(CH_2)_6$MgCl solution (Grignard reagent) was obtained from the reaction between tBu-O—$(CH_2)_6$Cl compound and Mg(0) in diethyl ether ($Et_2O$) solvent. $MeSiCl_3$ compound (24.7 ml, 0.21 mol) was added thereto at −100° C., stirred at room temperature for 3 hours or more, and the filtered solution was vacuum-dried to obtain (tBu-O—$(CH_2)_6$SiMeCl_2 compound (yield 84%). A fluorenyllithium (4.82 g, 0.028 mol)/hexane (150 ml) solution was slowly added to a tBu-O—$(CH_2)_6$SiMeCl_2 solution (7.7 g, 0.028 mol) which is dissolved in hexane (50 ml) at −78° C. over 2 hours. The white precipitate (LiCl) was filtered, and the desired product was extracted with hexane. Then, all volatile substances were vacuum-dried to obtain a pale-yellow oily compound of (tBu-O—$(CH_2)_6$)SiMe(9-$C_{13}H_{10}$) (yield 99%).

THF solvent (50 ml) was added thereto, and the mixture was reacted with a $C_5H_5Li$(2.0 g, 0.028 mol)/THF (50 ml) solution at room temperature for 3 hours or more. Then, all volatile substances were vacuum-dried and extracted with hexane to obtain a final ligand, an orange oily compound of (tBu-O—$(CH_2)_6$)($CH_3$)Si($C_5H_5$)(9-$C_{13}H_{10}$) (yield 95%). The structure of the ligand was confirmed through 1H NMR.

In addition, 2 equivalents of n-BuLi was added to a (tBu-O—(CH$_2$)$_6$)(CH$_3$)Si(C$_5$H$_5$)(9-C$_{13}$H$_{10}$) (12 g, 0.028 mol)/THF (100 mol) solution at −78° C., and reacted for 4 hours or more while raising the temperature to room temperature to obtain an orange solid compound of (tBu-O—(CH$_2$)$_6$)(CH$_3$)Si(C$_5$H$_5$Li)(9-C$_{13}$H$_{10}$Li) (yield 81%). In addition, a dilithium salt (2.0 g, 4.5 mmol)/ether (30 ml) solution was slowly added to a ZrCl$_4$ (1.05 g, 4.50 mmol)/ether (30 ml) suspension solution at −78° C., and further reacted at room temperature for 3 hours. All volatile substances were vacuum-dried, and a dichloromethane solvent was added to the obtained oily liquid substance to filter off. After vacuum-drying the filtered solution, hexane was added to obtain a precipitate. The obtained precipitate was washed several times with hexane to obtain a red solid racemic-(tBu-O—(CH$_2$)$_6$)(CH$_3$)Si(C$_5$H$_4$)(9-C$_{13}$H$_9$)ZrCl$_2$ compound (3) (yield 54%).

Subsequently, a supported hybrid catalyst in which the compound (1b) and the compound (3) were supported was prepared in the same manner as in Synthesis Example 1, except that the compound (3) synthesized above was used instead of the compound of Chemical Formula 2a.

Examples 2 to 4 and Comparative Examples 1 to 4

An ethylene/1-hexene copolymer was prepared in the same manner as in Example 1, except that the conditions were changed as described in Table 1 below.

Comparative Example 5

A commercially available ethylene/1-hexene copolymer (Exxon XP8318™, gas phase polymerization) was used.

Comparative Example 6

A commercially available ethylene/1-hexene copolymer (Exxon XP8656MIL™, gas phase polymerization) was used.

Comparative Example 7

A commercially available ethylene/1-hexene copolymer (Daelim BO1801EN™, gas phase polymerization) was used.

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Catalyst | Syn. Ex. 1 | Syn. Ex. 1 | Syn. Ex. 1 | Syn. Ex. 1 | Syn. Ex. 1 | Syn. Ex. 1 | Syn. Ex. 1 | Syn. Ex. 2 |
| Catalytic activity * (kgPE/gCat) | 6.0 | 6.2 | 6.2 | 6.4 | 6.0 | 6.5 | 5.8 | 6.7 |
| Polymerization process | Slurry polymerization | Slurry polymerization | Slurry polymerization | Slurry polymerization | Slurry polymerization | Slurry polymerization | Slurry polymerization | Slurry polymerization |
| Polymerization temp. (° C.) | 85 | 85 | 85 | 85 | 85 | 85 | 85 | 85 |
| H$_2$ input (ppm) | 15 | 15 | 20 | 50 | 5 | 200 | 15 | 20 |
| Ethylene input (kg/h) | 25 | 25 | 25 | 25 | 25 | 25 | 25 | 25 |
| Comonomer | 1-hexene | 1-hexene | 1-hexene | 1-hexene | 1-hexene | 1-hexene | 1-hexene | 1-hexene |
| Comonomer input (kg/h) | 3.0 | 3.5 | 3.0 | 3.0 | 2.8 | 3.5 | 2.5 | 4.5 |
| Molar ratio of comonomer/ethylene ** | 0.25 | 0.27 | 0.25 | 0.26 | 0.24 | 0.26 | 0.20 | 0.32 |

* Catalytic activity (kgPE/gCat): After measuring the weight of the catalyst (Cat) used in the polymerization reaction of Example or Comparative Example and the weight of the polymer (PE) prepared from the polymerization reaction, respectively, an activity of the catalyst was calculated as a weight ratio of the prepared polymer to the used catalyst.
** Molar ratio of comonomer/ethylene: In the above table, the molar ratio of comonomer/ethylene is a molar ratio of comonomer (1-hexene) to ethylene present in the slurry reactor during the polymerization reaction. The concentrations of ethylene and 1-hexene were measured using gas chromatograph, respectively, and the molar ratio was calculated from the results.

<Preparation of Ethylene/α-Olefin Copolymer>

Example 1

In the presence of the supported hybrid catalyst prepared above, ethylene-1-hexene was slurry-polymerized under the conditions shown in Table 1 below.

At this time, the polymerization reactor was a 140 L continuous polymerization reactor which is an isobutane slurry loop process, and the reaction flow rate was about 7 m/s. Gases (ethylene, hydrogen) required for polymerization and 1-hexene, which is a comonomer, were constantly and continuously injected, and respective flow rates were adjusted according to the target product. The concentrations of all gases and the comonomer 1-hexene were confirmed by on-line gas chromatograph. The supported catalyst was introduced to the isobutane slurry, and the polymerization was performed at a reactor pressure of about 40 bar and a polymerization temperature of about 85° C.

In addition, the concentration of each monomer was measured using gas chromatography (7890B GC) equipped with an Al$_2$O$_3$ KCl column having a length of 50 m and an inner diameter of 0.53 mm manufactured by Agilent. The carrier gas was high purity helium flowing at a rate of 12 mL/min, the inlet temperature was 200° C., and a separation mode (10:1) was used for injection.

Experimental Example 1

The elution temperature (Te) and the content of the first semicrystalline polymer exhibiting low crystallinity with the Te of 25 to 30° C. were measured by temperature rising elution fractionation (TREF) analysis. In addition, the number average molecular weight (Mn) and the weight average molecular weight (Mw) were measured by gel permeation chromatography analysis.

(1) TREF Analysis

A TREF apparatus manufactured by Polymer Char was used, and the measurement was performed using 1,2,4- trichlorobenzene as a solvent in the range of 20° C. to 120° C. Specifically, 30 mg of the polyethylene of Example or Comparative Example was dissolved in 20 ml of 1,2,4-trichlorobenzene solvent at 135° C. for 30 minutes, and then stabilized at 95° C. for 30 minutes to prepare each sample. The sample prepared above was introduced into a TREF column, cooled down to 20° C. at a rate of 0.5° C./min, and held for 2 minutes. Then, the temperature was increased from 20° C. to 120° C. at a constant temperature increase rate of 1° C./min, and a concentration of the eluted polyethylene was measured while flowing the 1,2,4-trichlorobenzene solvent in the column at a flowing rate of 0.5 mL/min.

The elution temperature (Te) of the polyethylene was confirmed from the resulting TREF elution curve, and the content of the first semicrystalline polymer with the Te of 25 to 30° C. was calculated based on the total weight of polyethylene (wt %).

(2) GPC Analysis

Gel permeation chromatography (GPC) was used to measure the number average molecular weight (Mn) and weight average molecular weight (Mw) of the low crystalline polymer, that is, the semicrystalline polymer with the Te of 25 to 30° C.

The measurement was performed using Waters PL-GPC220 and a Polymer Laboratories PLgel MIX-B 300 mm length column. An evaluation temperature was 160° C., and 1,2,4-trichlorobenzene was used for a solvent at a flow rate of 1 mL/min. The sample at a concentration of 10 mg/10 mL was supplied in an amount of 200 μL. Mw and Mn were obtained using a calibration curve formed using a polystyrene standard. 9 kinds of the polystyrene standard were used with the molecular weight (g/mol) of 2,000/10,000/30,000/70,000/200,000/700,000/2,000,000/4,000,000/10,000,000.

The analysis results are shown in Table 2 below and FIGS. 1 to 7.

FIGS. 1 to 4 are graphs showing TREF analysis results of the polyethylene prepared in Example 1 and Comparative Examples 5 to 7, respectively, and FIGS. 5 to 7 are graphs showing GPC analysis results of the first semicrystalline polymer in the polyethylene prepared in Example 1 and Comparative Examples 5 and 6, respectively.

according to ASTM D 1238, and expressed as the weight (g) of the polymer that has been melted for 10 minutes.

(2) Density (g/cm$^3$): The density was measured according to ASTM D1505.

(3) Melting temperature (Tm), crystallization temperature (Tc), and ΔH (0~130° C.): Tm, Tc, and ΔH were measured using differential scanning calorimeter (DSC), respectively.

Specifically, the measurement was performed using DSC 2920 manufactured by TA instrument as differential scanning calorimeter. The temperature of the copolymer of Example or Comparative Example was increased to 190° C., and maintained at that temperature for 5 minutes. After that, the temperature was lowered to −50° C., and increased again. Herein, the temperature was increased and lowered at a rate of 10° C./min, respectively. The melting temperature (Tm) was taken as the maximum point of an endothermic peak measured at the second heating period.

In addition, the crystallization temperature (Tc) was measured in the same manner as in the melting temperature measurement, and the maximum point of an exothermic peak in the curve appearing while decreasing the temperature was taken as the crystallization temperature.

In addition, ΔH is an integral value of the peak observed in the temperature range of 0 to 130° C. in the graph obtained by performing DSC in the temperature range of −50 to 190° C. in the same manner as the melting temperature measurement, and a heat of fusion value was confirmed (unit: J/g).

(4) Number average molecular weight (Mn), weight average molecular weight (Mw), molecular weight distribution (MWD): The number average molecular weight (Mn) and the weight average molecular weight (Mw) were respectively measured using gel permeation chromatography (GPC). The molecular weight distribution (Mw/Mn) was calculated by dividing the weight average molecular weight by the number average molecular weight.

Specifically, the measurement was performed using Waters PL-GPC220 and a Polymer Laboratories PLgel MIX-B 300 mm length column. An evaluation temperature

TABLE 2

|  |  | Examples | | | | Comparative Examples | | | | | | |
| --- | --- | --- | --- | --- | --- | --- | --- | --- | --- | --- | --- | --- |
|  |  | 1 | 2 | 3 | 4 | 1 | 2 | 3 | 4 | 5 | 6 | 7 |
| Te1 (° C.) |  | 28.5 | 28.1 | 28.0 | 28.1 | 28.0 | 28.0 | 28.1 | 28.1 | 28.1 | 28.1 | 25.1 |
| Te2 (° C.) |  | 62.5 | 62.0 | 62.6 | 62.2 | 63.5 | 60.2 | 62.3 | — | 68.1 | 67.5 | 73.9 |
| Te3 (° C.) |  | 93.8 | 93.0 | 93.7 | 93.5 | 94.0 | 92.8 | 93.0 | 87.4 | 95.8 | 95.7 | 85.0 |
| Te4 (° C.) |  | — | — | — | — | — | — | — | — | — | — | 95.8 |
| First-semicrystalline polymer with Te of 25~30° C. | Content (wt %) | 12.0 | 13.0 | 12.2 | 12.5 | 8.0 | 9.5 | 6.5 | 1.2 | 3.9 | 4.9 | 2.1 |
|  | Mn (g/mol) | 70,000 | 73,000 | 70,000 | 70,000 | 300 | 305 | 300 | 300 | 302 | 315 | 295 |
|  | Mw (g/mol) | 205,000 | 206,000 | 204,000 | 202,000 | 320 | 310 | 310 | 310 | 325 | 329 | 309 |
|  | Mw/Mn | 2.93 | 2.95 | 2.92 | 2.90 | 1.07 | 1.02 | 1.03 | 1.03 | 1.08 | 1.04 | 1.05 |

Experimental Example 2

The physical properties of the ethylene/α-olefin copolymer prepared in Examples and Comparative Examples were measured by the following method, and the results are shown in Table 3 below and FIGS. 8 to 11.

(1) Melt index (MI, g/10 min): The melt index (M12.16) was measured at 190° C. under a load of 2.16 kg was 160° C., and 1,2,4-trichlorobenzene was used for a solvent at a flow rate of 1 mL/min. The sample at a concentration of 10 mg/10 mL was supplied in an amount of 200 μL. Mw and Mn were obtained using a calibration curve formed using a polystyrene standard. 9 kinds of the polystyrene standard were used with the molecular weight (g/mol) of 2,000/10,000/30,000/70,000/200,000/700,000/2,000,000/4,000,000/10,000,000.

(5) Average number of SCBs: Through gel permeation chromatography combined with Fourier transform infrared spectroscopy (GPC-FTIR), the number of SCBs in the copolymer and the number of SCBs in a high-molecular weight region having log Mw of 5.5 or more were calculated, respectively, and expressed as average values.

Specifically, a molecular weight distribution curve of polymer chains constituting the copolymer, which has the x-axis of a log value of weight average molecular weight (log Mw) and the y-axis of a molecular weight distribution with respect to the log value (dw/d log Mw), was obtained by analyzing each copolymer prepared in Examples and Comparative Examples in the same manner as in 4) through GPC.

Thereafter, each copolymer was analyzed through FT-IR to derive a distribution curve of the number of SCBs per 1000 carbon atoms (right y-axis; SCBs per 1000TC) with respect to the weight average molecular weight (x-axis) of the polymer chains.

From these results, the number of SCBs per 1000 carbon atoms in the polymer in a high-molecular weight region having log Mw of 5.5 or more and the number of SCBs per 1000 carbon atoms in the copolymer were calculated, respectively, and expressed as average values.

Comparing FIGS. 8 to 11, it could be confirmed that Example 1 had the high SCB content in the ultra-high molecular weight region, and as a result, the low crystal content was high and the low crystal had a high molecular weight.

From the above results, it could be confirmed that Examples 1 and 2 had the higher SCB contents in the ultra-high molecular weight region compared to the copolymers of Comparative Examples 4, 5 and 7 having similar MI and density. From this, it could be expected that Examples 1 and 2 exhibit excellent low-temperature sealing strength.

Experimental Example 3

Seal initiation temperature (SIT) and hot-tack strength (N/25 mm) as low-temperature sealing strength were measured for the ethylene/1-hexene copolymers prepared in Examples and Comparative Examples according to ASTM F1921 using a J&B hot tack tester (Hot tacker 4000), and the results are shown in Table 4 and FIG. 12.

<Measurement Conditions>
Pressure: 0.275 N/mm$^2$
Sealing time: 0.5 sec
Cooling time: 0.1 sec

TABLE 3

|  | Examples | | | | Comparative Examples | |
| --- | --- | --- | --- | --- | --- | --- |
|  | 1 | 2 | 3 | 4 | 1 | 2 |
| Density (g/cm$^3$) | 0.918 | 0.916 | 0.918 | 0.918 | 0.918 | 0.918 |
| MI (g/10 min) | 1.0 | 1.0 | 1.5 | 2.0 | 0.4 | 10.5 |
| Tm (° C.) | 121.5 | 120.0 | 120.5 | 120.2 | 122.5 | 119.5 |
| Tc (° C.) | 102.1 | 101.5 | 102.0 | 101.7 | 105.1 | 100.0 |
| ΔH (0~130° C.) (J/g) | 115.0 | 105.0 | 112.0 | 110.0 | 118.5 | 114.0 |
| Mn (g/mol) | 43,000 | 44,000 | 40,000 | 38,000 | 52,000 | 16,000 |
| Mw (g/mol) | 112,000 | 114,000 | 110,000 | 107,000 | 152,000 | 48,000 |
| MWD | 2.65 | 2.70 | 2.65 | 2.60 | 2.70 | 2.80 |
| Avg. num. of SCBs (#1000C) | 20.0 | 21.5 | 20.5 | 20.7 | 18.5 | 19.0 |
| Avg. num. of SCBs in high Mw region of log Mw ≥5.5 (#1000C) | 36.5 | 38.0 | 36.7 | 37.0 | 32.5 | 34.0 |

|  | Comparative Examples | | | | |
| --- | --- | --- | --- | --- | --- |
|  | 3 | 4 | 5 | 6 | 7 |
| Density (g/cm$^3$) | 0.921 | 0.918 | 0.918 | 0.916 | 0.918 |
| MI (g/10 min) | 1.0 | 1.0 | 1.0 | 0.5 | 1.0 |
| Tm (° C.) | 122.0 | 118.0 | 122.1 | 122.7 | 122.3 |
| Tc (° C.) | 102.0 | 105.0 | 107.4 | 105.8 | 63.2/106.4 |
| ΔH (0~130° C.) (J/g) | 119.5 | 114.0 | 111.9 | 99.2 | 141.2 |
| Mn (g/mol) | 41,000 | 42,000 | 32,000 | 34,000 | 29,000 |
| Mw (g/mol) | 111,000 | 100,000 | 110,000 | 131,000 | 99,000 |
| MWD | 2.75 | 2.52 | 3.41 | 3.82 | 3.41 |
| Avg. num. of SCBs (#1000C) | 16.5 | 17.0 | 20.4 | 21.7 | 17.5 |
| Avg. num. of SCBs in high Mw region of log Mw ≥5.5 (#1000C) | 32.5 | 11.5 | 27.4 | 32.5 | 26.1 |

FIGS. 8 to 11 are graphs showing the SCB contents with respect to molecular weight of polyethylene obtained by GPC-FTIR analysis of polyethylenes prepared in Example 1 and Comparative Examples 5 to 7, respectively.

Peeling speed: 200 mm/s
Width: 25 mm
Thickness: 50 to 60 μm

TABLE 4

| | | Examples | | | | Comparative Examples | | | | | | |
|---|---|---|---|---|---|---|---|---|---|---|---|---|
| | | 1 | 2 | 3 | 4 | 1 | 2 | 3 | 4 | 5 | 6 | 7 |
| SIT(° C.), 2N | | 90.0 | 87.0 | 89.0 | 87.0 | 97.0 | 95.0 | 100.1 | 115.0 | 107.5 | 98.0 | 120.0 |
| Hot-tack | 90° C. | 2.0 | 2.5 | 2.1 | 2.5 | — | — | — | — | — | — | — |
| Strength | 95° C. | 3.0 | 3.2 | 3.0 | 3.0 | 1.5 | 2.0 | — | — | — | 1.5 | — |
| (N/25 mm) | 100° C. | 3.2 | 3.8 | 3.1 | 3.3 | 2.3 | 2.3 | 2.0 | — | 1.1 | 2.6 | — |

In Table 4, "—" means not measured.

FIG. 12 is a graph showing the results of measuring the low-temperature sealing strength of the polyethylenes prepared in Example 1 and Comparative Examples 5 to 7.

Referring to the results, in Examples 1 and 2, the seal initiation temperature (SIT) under the 2N condition was as low as 90° C. or less, and the sealing strength was high in the wide melting temperature, compared to Comparative Examples.

The invention claimed is:

1. A polyethylene comprising an ethylene repeating unit and an α-olefin-based repeating unit,
    wherein the polyethylene has a density of 0.916 g/cm³ or more, measured according to ASTM D1505, and has three elution temperatures of Te1, Te2, and Te3 corresponding to elution temperatures of first to third semicrystalline polymer fractions contained in the polyethylene, respectively, when analyzed by temperature rising elution fractionation (TREF) in a temperature range of 20 to 120° C.,
    Te2 is lower than Te3 and higher than Te1,
    Te1 is 25 to 30° ° C., and
    the first semicrystalline polymer fraction has a weight average molecular weight of 200,000 g/mol or more, and is present in an amount of 5 wt % or more based on a total weight of the polyethylene.

2. The polyethylene of claim 1, wherein the first semicrystalline polymer fraction has a weight average molecular weight of 200,000 to 500,000 g/mol, and is present in an amount of 10 to 20 wt % based on a total weight of the polyethylene.

3. The polyethylene of claim 1, wherein Te2 is 40 to 65° C., and Te3 is 80 to 100° C.

4. The polyethylene of claim 1, wherein the polyethylene has an average number of short chain branches per 1000 carbons of 35 or more in a high-molecular weight region having log Mw of 5.5 or more, when analyzed by gel permeation chromatography combined with Fourier transform infrared spectroscopy.

5. The polyethylene of claim 1, wherein an average number of short chain branches per 1000 carbons in the polyethylene is 18 to 22.

6. The polyethylene of claim 1, wherein the polyethylene has a molecular weight distribution of 3 or less.

7. The polyethylene of claim 1, wherein the polyethylene has a number average molecular weight of 35,000 to 50,000 g/mol, and a weight average molecular weight of 100,000 to 130,000 g/mol.

8. The polyethylene of claim 1, wherein the polyethylene satisfies at least one of the following conditions (i) to (v):
    (i) Melt index measured at 190° C. under a load of 2.16 kg according to ASTM D-1238: 0.8 to 2 g/10 min,
    (ii) Melting temperature: 120 to 125° C.,
    (iii) Crystallization temperature: 100 to 110° C.,
    (iv) Heat of fusion in a temperature range of 0 to 130° C.: 99.5 to 120 J/g, and
    (v) Seal initiation temperature under a 2N condition is 95° C. or less and hot-tack strength at 100° C. is 3.0 N or more, when measured according to ASTM F1921.

9. The polyethylene of claim 1, wherein the α-olefin comprises 1-butene, 1-pentene, 1-hexene, 1-heptene, 1-octene, 1-decene, 1-undecene, 1-dodecene, 1-tetradecene, 1-hexadecene or a mixture thereof.

10. The polyethylene of claim 9, wherein the α-olefin is 1-hexene.

11. A method for preparing the polyethylene according to claim 1, comprising polymerizing an ethylene monomer and an α-olefin-based monomer having 3 or more carbon atoms in the presence of a catalyst composition comprising a first transition metal compound represented by Chemical Formula 1 and a second transition metal compound represented by Chemical Formula 2 while introducing hydrogen gas into a reactor,
    wherein the hydrogen gas is introduced in an amount of 10 ppm or more and less than 200 ppm based on a total weight of the monomer comprising the ethylene monomer and the α-olefin-based monomer having 3 or more carbon atoms, and
    a molar ratio of the α-olefin-based monomer having 3 or more carbon atoms to the ethylene monomer present in the reactor is 0.25 or more during the polymerization:

[Chemical Formula 1]

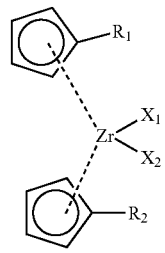

in Chemical Formula 1,
    $R_1$ and $R_2$ are each independently hydrogen, halogen, $C_{1-20}$ alkyl, $C_{2-20}$ alkenyl, $C_{1-20}$ alkoxy, $C_{2-20}$ alkoxyalkyl, $C_{6-20}$ aryl, $C_{7-20}$ alkylaryl, or $C_{7-20}$ arylalkyl, and
    $X_1$ and $X_2$ are each independently halogen or $C_{1-20}$ alkyl,

[Chemical Formula 2]

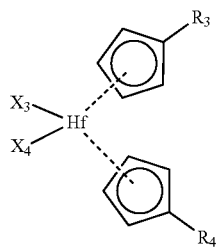

in Chemical Formula 2,
R₃ and R₄ are each independently hydrogen, halogen, $C_{1-20}$ alkyl, $C_{2-20}$ alkenyl, $C_{1-20}$ alkoxy, $C_{2-20}$ alkoxyalkyl, $C_{6-20}$ aryl, $C_{7-20}$ alkylaryl, or $C_{7-20}$ arylalkyl, and
X₃ and X₄ are each independently halogen or $C_{1-20}$ alkyl.

12. The method of claim 11, wherein R₁ and R₂ are each independently $C_{4-12}$ linear alkyl, or $C_{5-9}$ linear alkyl substituted with tert-butoxy.

13. The method of claim 11, wherein R₃ and R₄ are each independently $C_{3-12}$ linear alkyl, and
X₃ and X₄ are each independently $C_{1-4}$ linear alkyl.

14. The method of claim 11, wherein the first transition metal compound is represented by Chemical Formula 1a or Chemical Formula 1b:

[Chemical Formula 1a]

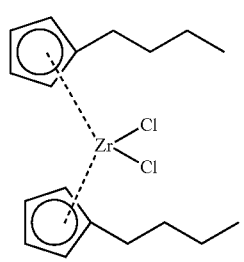

[Chemical Formula 1b]

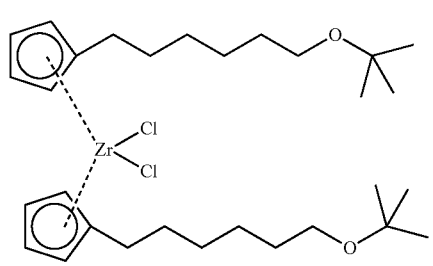

15. The method of claim 11, wherein the second transition metal compound is represented by Chemical Formula 2a or Chemical Formula 2b:

[Chemical Formula 2a]

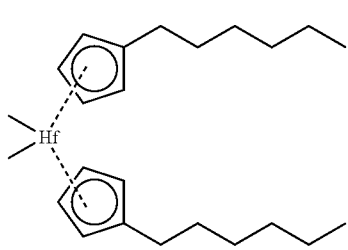

[Chemical Formula 2b]

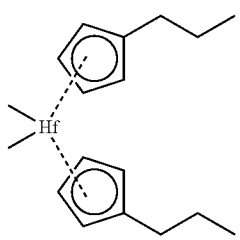

16. The method of claim 11, wherein the first transition metal compound and the second transition metal compound are present in a molar ratio of 1:0.3 to 1:3.5.

17. The method of claim 11, wherein the catalyst composition further comprises at least one of a support or a cocatalyst.

18. A film comprising the polyethylene according to claim 1.

* * * * *